(12) United States Patent
Craig et al.

(10) Patent No.: US 7,421,005 B2
(45) Date of Patent: Sep. 2, 2008

(54) FREQUENCY OFFSET HOPPING FOR TELECOMMUNICATIONS

(75) Inventors: Stephen Craig, Stockholm (SE); Henrik Nyberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 834 days.

(21) Appl. No.: 10/681,569

(22) Filed: Oct. 9, 2003

(65) Prior Publication Data

US 2005/0078737 A1   Apr. 14, 2005

(51) Int. Cl.
*H04B 1/00* (2006.01)
(52) U.S. Cl. .................................... 375/132
(58) Field of Classification Search ......... 375/132–139, 375/130; 455/447, 517, 452.1, 422.1, 524, 455/63.1, 47; 370/337, 319
See application file for complete search history.

(56) References Cited

U.S. PATENT DOCUMENTS

| | | | |
|---|---|---|---|
| 5,153,904 A * | 10/1992 | Coombes et al. ............ | 455/462 |
| 5,430,761 A | 7/1995 | Bruckert et al. | |
| 5,455,962 A | 10/1995 | Kotzin | |
| 5,913,172 A * | 6/1999 | McCabe et al. ............. | 455/503 |
| 6,112,094 A | 8/2000 | Dent | |
| 6,223,048 B1 | 4/2001 | Noll Barreto et al. | |
| 6,233,270 B1 | 5/2001 | Craig et al. | |
| 6,259,686 B1 | 7/2001 | Blanc et al. | |
| 6,405,048 B1 | 6/2002 | Haartsen | |
| 6,430,211 B1 * | 8/2002 | Aiello ........................ | 375/135 |
| 6,584,140 B1 * | 6/2003 | Lee ............................. | 375/132 |
| 6,597,672 B1 | 7/2003 | Gustafsson et al. | |
| 6,606,500 B1 | 8/2003 | Kronestedt | |
| 2003/0060209 A1 * | 3/2003 | Bruin et al. ................. | 455/452 |

FOREIGN PATENT DOCUMENTS

| | | |
|---|---|---|
| WO | 01/24400 A1 | 4/2001 |
| WO | 01/63785 A1 | 8/2001 |

OTHER PUBLICATIONS

Tech Spec: 3GPP TS 45.002 v5.10.0; 3$^{rd}$ Generation Partnership Project: Tech. Spec. Group GSM/EDGE Radio Access Network; Multiplexing and Multiple Access on the Radio Path (Release 5), Jun. 2003.

(Continued)

*Primary Examiner*—Mohammad Ghayour
*Assistant Examiner*—Vineeta S Panwalkar
(74) *Attorney, Agent, or Firm*—Nixon & Vanderhye, P.C.

(57) ABSTRACT

A frequency hopping sequence generator system (40) for use in a radio telecommunications system utilizes variable frequency offsets (FO) to determine a frequency hopping sequence for use in communication between a mobile station and a network node. The frequency hopping sequence generator comprises a frequency offset hopping generator (42) which chooses the variable frequency offsets so that the frequency hopping sequence provides intra-cell interference diversity. For each mobile station, the frequency offset hopping generator determines a frequency offset index (FOI) which is mapped to one of plural possible frequency offsets (FO). The frequency offset index (and thus the corresponding frequency offset) is determined to provide the frequency hopping sequence with both interference diversity and orthogonality. The frequency offset index has an inter-cell component (that provides, e.g., collision diversity between FO hopping sequences that are not orthogonal) and an intra-cell component (that provides orthogonal (non-colliding) sequences with a variable difference between two sequences).

40 Claims, 14 Drawing Sheets

OTHER PUBLICATIONS

Blom, "Ericsson's GSM RAN Capacity Solutions", Ericsson Review No. 2, 2002, pp. 84-89.

Tech. Spec.: ETSI EN 300 908, V8.5.1; "Digital Cellular Telecommunications System (Phase 2+); Multiplexing and Multiple Access on the Radio Path" (GSM 05.02 version 8.5.1 Release 1999).

GSM Tech. Spec., GSM 05.01, "Digital Cellular Telecommunications System (Phase 2+); Physical Layer on the Radio Path; General Description" (GSM 05.01 version 5.4.0), Apr. 1998.

International Search Report mailed Feb. 2, 2005 in corresponding PCT application No. PCT application No. PCT/SE2004/001347.

* cited by examiner

FREQUENCY OFFSET HOPPING FOR TELECOMMUNICATIONS

BACKGROUND

1. Field of the Invention

The present invention pertains to the field of telecommunications, and particularly to frequency hopping techniques employed in cellular telecommunications systems.

2. Related Art and Other Considerations

Frequency hopping is often employed in cellular, radio telecommunications systems, such as the Global System for Mobile Communication (GSM), to improve system performance. In general, frequency hopping improves system performance by introducing frequency diversity and interference diversity. The improved performance means that a cellular network can be more heavily loaded if frequency hopping is used than it would have been otherwise. That is, frequency hopping increases the capacity of the network. The impact of frequency hopping on interference between mobiles has become more important due to the trend toward interference limited network planning with tighter frequency reuse.

In a radio telecommunications system that employs frequency hopping, typically a frequency hopping sequence is allocated to a mobile at call setup. Frequency diversity is achieved by transmitting each radio telecommunications signal on the sequence of frequencies over time. Each radio signal is transmitted over a sequence of frequencies because radio signals are often subject to amplitude variations called Rayleigh fading. However, in any given instance Rayleigh fading generally affects radio signals carried on some frequencies more so than other frequencies. Thus, transmitting a radio telecommunications signal over the sequence of different frequencies can increase the likelihood that the signal will be received correctly, as it is unlikely that Rayleigh fading will significantly negatively impact each and every frequency over which the radio telecommunications signal is being transmitted. This benefit exists for signals containing redundancy that enables bit errors experienced during the Rayleigh fading dips to be corrected. Accordingly, signal quality is improved and overall system performance is enhanced.

In addition to fading, a radio signal is often subject to varying degrees of interference caused by traffic (e.g., from closely located mobile stations) on the same frequency (i.e., co-channel interference) and traffic on an adjacent frequency (i.e., adjacent channel interference). If co-channel and/or adjacent channel interference is substantial, the signal quality associated with the radio signal may be severely impacted. In theory, frequency hopping, through the introduction of interference diversity, spreads the co-channel and adjacent channel interference among numerous end-users, such that the co-channel and adjacent channel interference experienced by a particular end-user is diversified. The overall effect is to raise the signal quality across the network, thereby improving overall system performance.

While frequency hopping improves system performance by improving signal quality, frequency reuse is designed to improve system performance by increasing system capacity. More specifically, frequency reuse permits two or more cells to simultaneously use the same frequency, or group of frequencies, so long as the distance (i.e., the "reuse distance") between the two cells is sufficient to minimize any co-channel interference that might otherwise have an adverse affect on signal quality. However, as the demand for cellular service increases, reuse distances are likely to decrease. And, as reuse distances decrease, co-channel interference is likely to increase.

In order to avoid severe interference between closely located mobile stations (e.g., mobile stations connected to the same base station) using the same set of frequencies, orthogonal frequency hopping sequences are allocated to these mobile stations. Two frequency hopping sequences Shad 1 and $S_2$ are orthogonal if $S_1(k) \neq S_2(k)$ for all time steps k. Orthogonality is depicted by the notation $S_1 \perp S_2$. The two frequency hopping sequences $S_1$ and $S_2$ are partially orthogonal if the collision probability $P(S_1(k)=S_2(k))=p$ for some $0<p<1$, as depicted by the notation $S_1 \perp_p S_2$. If $p=1/N$, where N is the number of frequencies used for frequency hopping, full interference diversity is provided. If p=0, there is orthogonality.

In accordance with conventional frequency hopping techniques, frequency hopping sequences can be derived from a reference frequency hopping sequence that is established for the entire system or a part of the system, e.g. a cell. Typically (e.g., as in GSM), the reference frequency hopping sequence is a cyclic or pseudo-random sequence determined by a cell specific parameter (e.g., Hopping Sequence Number "HSN") and a mobile-specific parameter allocated at call setup or handover. That is, a mobile station, at handover or call set-up, is informed of the cell specific parameter determining the reference frequency hopping sequence and is assigned the mobile-specific parameter (e.g., an available frequency offset) associated with the cell in which the mobile station is operating. The mobile station hops through a sequence of frequencies that are, over time, offset from the reference frequency hopping sequence by a fixed amount that is equal to its assigned frequency offset. In accordance with the GSM standard, each frequency offset is referred to as a Mobile Allocation Index Offset (i.e., MAIO). Depending on the values of these two parameters (HSN and MAIO, for instance) and the parameter that clocks the frequency hopping sequences through time (the TDMA frame number, for example), frequency hopping sequences used by two mobiles may be either identical, orthogonal, or non-orthogonal but with random collisions, so that interference diversity is achieved. Allocating different constant frequency offsets to mobile stations at call setup or handover is an attempt to obtain orthogonality.

Consider, for example, a reference frequency hopping sequence for a group of twelve frequencies denoted 1, 2, 3, . . . , 12 over the time period $t_1$-$t_{10}$ as being [9, 5, 11, 1, 3, 9, 12, 10, 7, 8]. If a first mobile station operating in a first cell with this reference frequency hopping sequence is, for example, assigned a frequency offset of zero, the first mobile station will hop through the sequence[9, 5, 11, 1, 3, 9, 12, 10, 7, 8] over the time period $t_1$-$t_{10}$. If a second mobile station operating in a second cell with the same group of twelve frequencies, the same simultaneous TDMA frame number (or other similar timing parameter), and the same reference frequency hopping sequence is assigned a frequency offset of seven, the second mobile station will hop through the sequence [4, 12, 6, 8, 10, 4, 7, 5, 2, 3] over the time period $t_1$-$t_{10}$. In accordance with conventional frequency hopping techniques, the frequency offset assigned to each mobile station remains constant. Thus, the frequency offset between the first mobile station operating in the first cell and the second mobile station operating in the second cell as described above remains at a fixed value modulo the number of frequencies in the frequency hopping sequence (in this case, it remains fixed at seven modulo twelve).

In order to handle interference limited networks more efficiently, various strategies have been proposed, e.g., synchronization of groups of cells combined with smart frequency hopping sequence allocation to minimize co-channel and adjacent channel interference between mobile stations in selected cells. However, conventional strategies have various limitations. These limitations emanate from the fact that, when dealing with interference, there are two important components to consider. A first component is co-channel interference between mobile stations using the same frequency simultaneously. A second component is adjacent channel interference between mobile stations which are using contiguous frequencies simultaneously.

A first limitation of conventional frequency hopping strategies is lack of adjacent channel interference diversity within a cell and between synchronized cells using the same basic frequency hopping sequence and timing parameter value (i.e., cells which are allocated the same HSNs and simultaneously have the same TDMA frame number in GSM).

A second limitation of conventional frequency hopping strategies is lack of co-channel interference diversity between synchronized cells using the same basic frequency hopping sequence, the same timing parameter value, and the same frequency offsets (e.g., cells using the same HSNs, simultaneous TDMA frame numbers, and MAIOs in GSM).

A third limitation of conventional frequency hopping strategies is insensitivity to discrepancies (e.g., non-randomness) in the basic frequency hopping sequences.

U.S. Pat. No. 6,233,270 to Craig et al, incorporated by reference herein, discloses a mobile station hopping from one frequency to another as a function of the reference frequency hopping sequence plus a frequency offset hopping sequence which it has been assigned. The frequency offset hopping sequence is different in each of the synchronized cells, thereby creating interference diversity. U.S. Pat. No. 6,233,270 thus describes a method to obtain interference diversity between synchronized cells that have been allocated a same frequency hopping sequence.

But, as mentioned before, interference diversity within a cell can also be important, both for synchronized and unsynchronized networks in which either intracell co-channel or intra-cell adjacent channel interference occurs. Intracell interference arises, for example, when a blocked BCCH configuration is employed in a one reuse network and the hardware load is above 0.5 since the use of adjacent frequencies in the same cell cannot be avoided in such a network. In such case it would be beneficial to avoid continuous (ignoring DTX) adjacent channel interference within the cell through frequency hopping.

The challenge, therefore, is to construct frequency offset hopping sequences which, in combination with the original frequency hopping sequences, provide both interference diversity between cells (even if the cells use the same basic frequency hopping sequences, the same sets of frequencies, the same simultaneous timing parameter values, and the same sets of frequency offsets) and adjacent channel diversity (e.g. within a cell), while maintaining orthogonality with respect to co-channel interference.

Assume, for example, a typical GSM frequency hopping method using two basic parameters: the hopping sequence number (HSN) and the frequency offset (MAIO) from the basic frequency hopping sequence. The challenge is to generate frequency offset hopping sequences so that, depending on the input parameters, two frequency offset sequences are either orthogonal with variable frequency offset difference, or non-orthogonal with random collisions so that interference diversity can be provided by the frequency offset sequences alone (irrespective of the basic frequency hopping sequence).

Accordingly, what is needed, and an object of the present invention, is frequency hopping apparatus and technique which provides interference diversity within a cell based on frequency offset.

Advantageously, in one or more of its aspects, the present invention addresses and solves the following issues:

Frequency offset hopping sequence generation that combines the elimination of co-channel interference (orthogonality) and adjacent channel interference diversity between selectable connections using the same set of frequencies.

Improved co-channel interference diversity between non-orthogonal sequences by frequency offset hopping sequences that improve the randomness of non-ideal pseudo-random frequency hopping in existing frequency hopping methods (e.g. GSM).

Frequency offset hopping sequence generation that easily can be combined with any existing frequency hopping generator using e.g. fixed frequency offsets.

Optimal, or near to optimal, adjacent channel interference diversity.

Controllability and flexibility by an appropriate set of parameters that are allocated to network nodes and mobile stations.

Scalability making the method useable and consistent for different network planning and frequency planning configurations.

BRIEF SUMMARY

A frequency hopping sequence generator system for use in a radio telecommunications system utilizes variable frequency offsets to determine a frequency hopping sequence for use in communication between a mobile station and a network node. The frequency hopping sequence generator can be situated in either the network node or the mobile station, and preferably similar frequency hopping sequence generators are situated in both the mobile station and the network node.

The frequency hopping sequence generator system comprises a frequency offset hopping generator which chooses the variable frequency offsets so that the frequency hopping sequence provides intra-cell (or adjacent channel) interference diversity. For each mobile station, the frequency offset hopping generator determines a frequency offset index which is mapped to one of plural possible frequency offsets. The frequency offset index (and thus the corresponding frequency offset) is determined to provide the frequency hopping sequence with both interference diversity and orthogonality (in particular simultaneous orthogonality and adjacent channel interference diversity between certain frequency hopping sequences). The frequency offset index has a first component and a second component. The first component of the frequency offset index is an inter-cell component and the second component is a intra-cell component. The first or inter-cell component is generated by an inter-cell sequence sub-generator; the second or intra-cell component is generated by an intra-cell component sub-generator.

The intra-cell component sub-generator introduces a new parameter (FOSEED); the inter-cell component introduces a new parameter (FOHSN). The FOHSN parameter serves as a frequency offset hopping sequence number and is assigned to a mobile station for yielding a unique pseudo-random sequence. The FOSEED parameter is assigned to a mobile station and used to avoid frequency collisions between mobiles with equal HSN and FOHSN and equal allocations of frequency offsets (FOs) and frequencies. The output of the intra-cell component sub-generator is an integer $I_2$ in the range 0 through NFO-1 (NFO being the number of possible frequency offsets in a set of frequency offsets). The intra-cell component provides orthogonal (non-colliding) sequences with a variable difference between two sequences. The effect of the variable difference is adjacent channel interference diversity. Adjacent channel interference diversity means that two mobile stations are not frequency "neighbors" constantly throughout the sessions.

The intra-cell component sub-generator can operate in either a "short sequences" mode or a "long sequences" mode. The long sequences mode renders adjacent frequency collision rates between two sequences with equal FOHSN independent of the choice of the two different FOSEEDs selected. On the other hand, the short sequences mode yields higher adjacent frequency collision rates between certain pairs than between other pairs.

In the short sequences mode, a frequency hopping sequence allocated to a mobile station is repeated cyclically. In one example embodiment of a short sequences mode scenario, the intra-cell component $I_2$ is determined by the intra-cell component sub-generator by evaluating the expression $I_2(FN, FOSEED)=S(1+(FN+FOSEED) \mod NFO)$, wherein S is a basic sequence of 0, 2, 4, ... $K_1$, $K_2$, $K_2-2$, ... 3, 1, in which $K_1=2*[(NFO-1)/2]$; $K_{2=2}*[(NFO)/2]-1$; FN is a time index; FOSEED is a unique integer assigned to a mobile station at call setup; and NFO is a number of frequency offsets in a set of possible frequency offsets. The output of the intra-cell component sub-generator is an integer I2 in the range 0 through NFO-1.

In the long sequences mode, rather than repeat the same short sequence every cycle, another one of the orthogonal sequences is employed according to a suicyclic scheme for switching between different short sequences for different mobiles. In one example embodiment of a long sequences mode scenario, the intra-cell component $I_2$ is determined by the intra-cell component sub-generator by evaluating the expression $I_2(FN, FOSEED)=S(1+(FN+K) \mod NFO)$, wherein the parameters S, $K_1$, $K_2$, FN, NFO, and FOSEED are similarly defined as in the short sequences mode, but $K=S(1+(FOSEED+FN \text{ div } NFO) \mod NFO)$.

The inter-cell component provides, e.g., collision diversity between FO hopping sequences that are not orthogonal. It takes as input, for each time-step, FOHSN, FN, and NFO (FOHSN and NFO are typically constant during a session). The output of the inter-cell component sub-generator is preferably a pseudo-random integer that must take values in, and should be distributed uniformly over, a range O-M, where M must be equal to, or greater than, NFO-1. Different FOHSNs yield unique output sequences for FN=0, 1, 2, ... with average collision rate equal to 1/(M+1) between any two different sequences. The inter-cell component sub-generator may use any method as long as the requirement on input and output are fulfilled. An example generator for use as the inter-cell component sub-generator is the standard GSM frequency hopping generator.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures.

Figure 1:
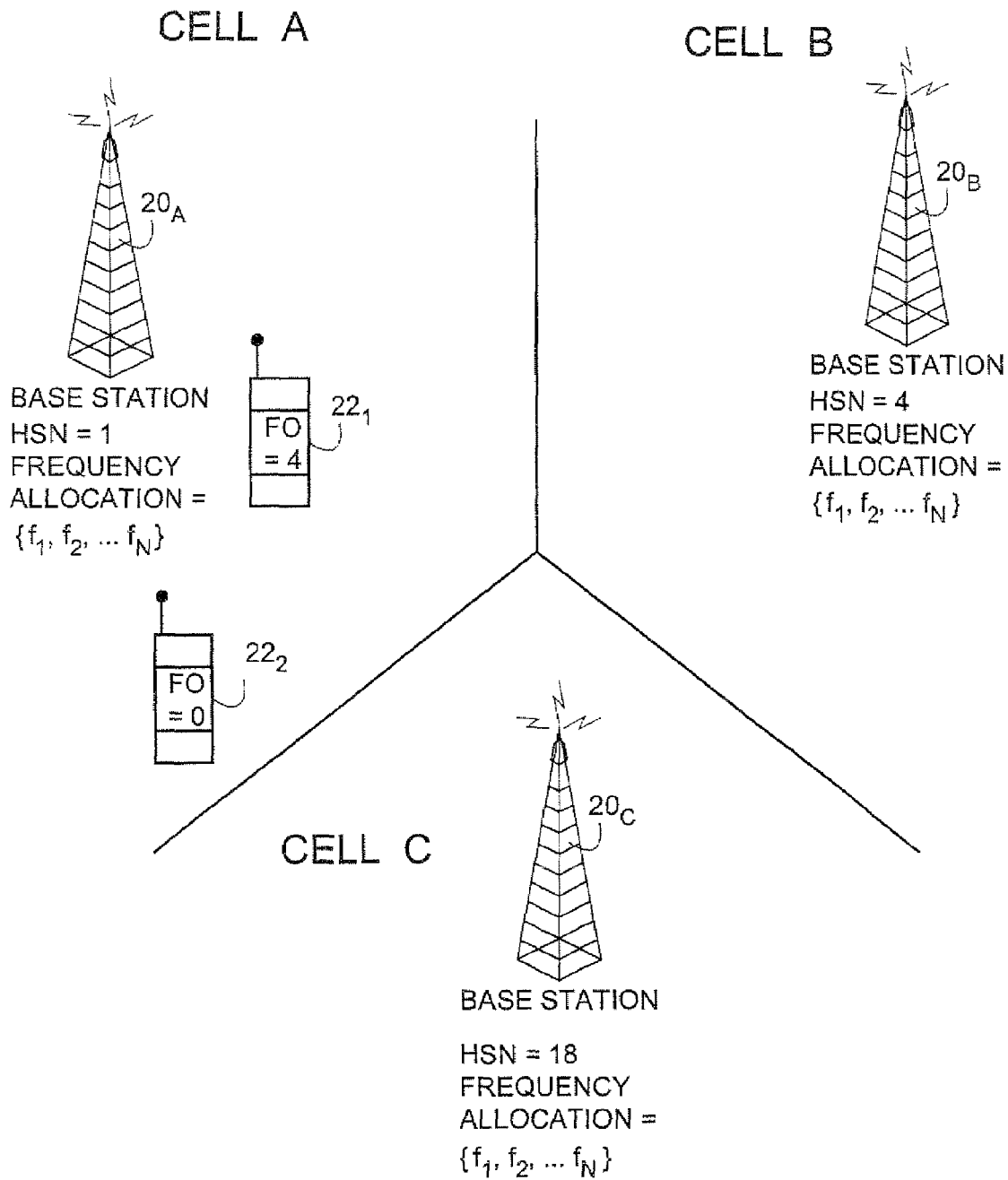
FIG. 1 is a diagrammatic view of a telecommunications network wherein frequency hopping sequences are allocated in conventional manner.

FIG. 1 shows a telecommunications network wherein frequency hopping sequences are allocated in conventional manner. The telecommunications network of FIG. 1 illustrates three cells, particularly cell A, cell B, and cell C, each cell having an associated respective base station $20_A$, $20_B$, and $20_C$. At the time shown in FIG. 1, two example, representative mobile stations $22_1$ and $22_2$ are operating in cell A. All base stations illustrated in FIG. 1 have been assigned the same frequency allocation. That is, each base station can operate on frequencies $f_1, f_2, \ldots f_N$.

Each base station of FIG. 1 has been assigned a hopping sequence number (HSN). Specifically, for base station $20_A$ HSN=1; for base station $20_B$ HSN=4; and, for base station $20_C$ HSN=18. Each hopping sequence number (HSN) refers to a particular basic (or reference) frequency hopping sequence. Using the hopping sequence number (HSN) is thus a shorthand way of assigned the corresponding basic (or reference) frequency hopping sequence to the base station.

In accordance with conventional practice, each of the mobile stations 22 operating in cell A has been assigned a different frequency offset (FO). For example, mobile station $22_1$, has been assigned FO=4, while mobile station $22_2$ has been assigned FO=0. In GSM parlance, the frequency offset (FO) is known as the Mobile Allocation Index Offset (MAIO). As discussed previously, the communication between each mobile station and the base station is performed over frequencies of a frequency hopping sequence, with the frequency hopping sequence being dependent upon the HSN and the frequency offset (FO) allocated to the mobile station.

Figure 2:
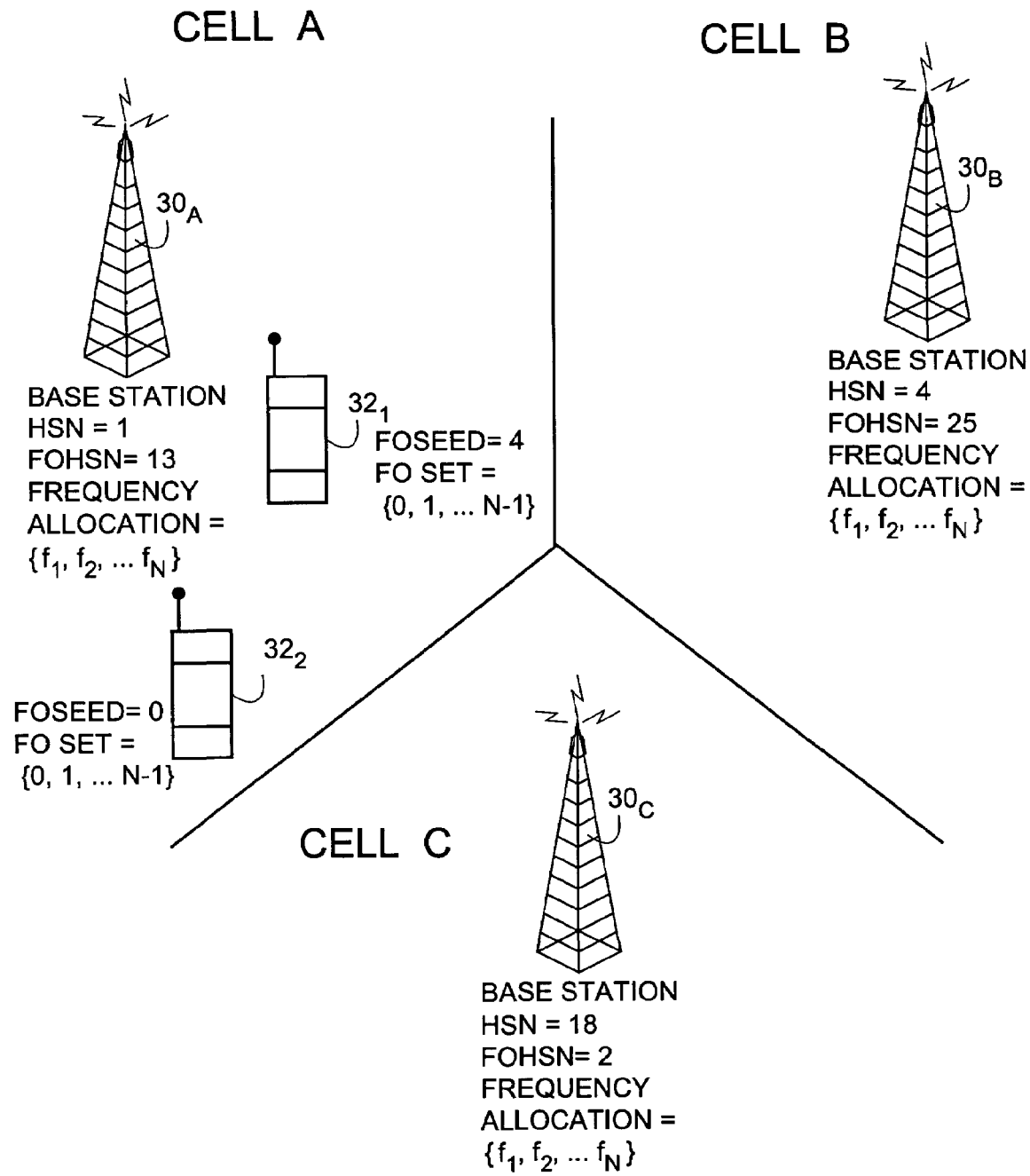
FIG. 2 is a diagrammatic view of a telecommunications network in which frequency hopping sequences are allocated in accordance with a variable frequency offset.

In contrast to FIG. 1, FIG. 2 shows a telecommunications network in which frequency hopping sequences are allocated in accordance with a variable frequency offset. The base stations $30_A$-$30_C$ of FIG. 2 serving respective cells A, B, and C are shown as having the same frequency offset and same hopping sequence number (HSN) as the corresponding cells of FIG. 1. In view of the capability of using variable frequency offsets, the mobile stations of FIG. 2 are provided with a frequency offset set (FO set) having N−1 members, as well as a new parameter known as FOSEED. In particular, mobile station $32_1$ has been assigned FOSEED=4, while mobile station $32_2$ has been assigned FOSEED=0. Further, in the network of FIG. 2, each base station 30 has been assigned a different value for a new parameter, FOHSN. As shown in FIG. 2, for base station $30_A$ FOHSN=13; for base station $30_B$ FOHSN=25; and for base station $30_C$ FOHSN=2.

The significance of these new parameters (e.g., FOSEED and FOHSN), as well as the employment and advantages of variable frequency offsets generally, are now described in the context of an example embodiment of a new frequency hopping sequence generation system compatible with the same. It should be understood that the embodiment herein discussed is only representative, and that other implementations and versions thereof may instead be utilized.

Figure 3:
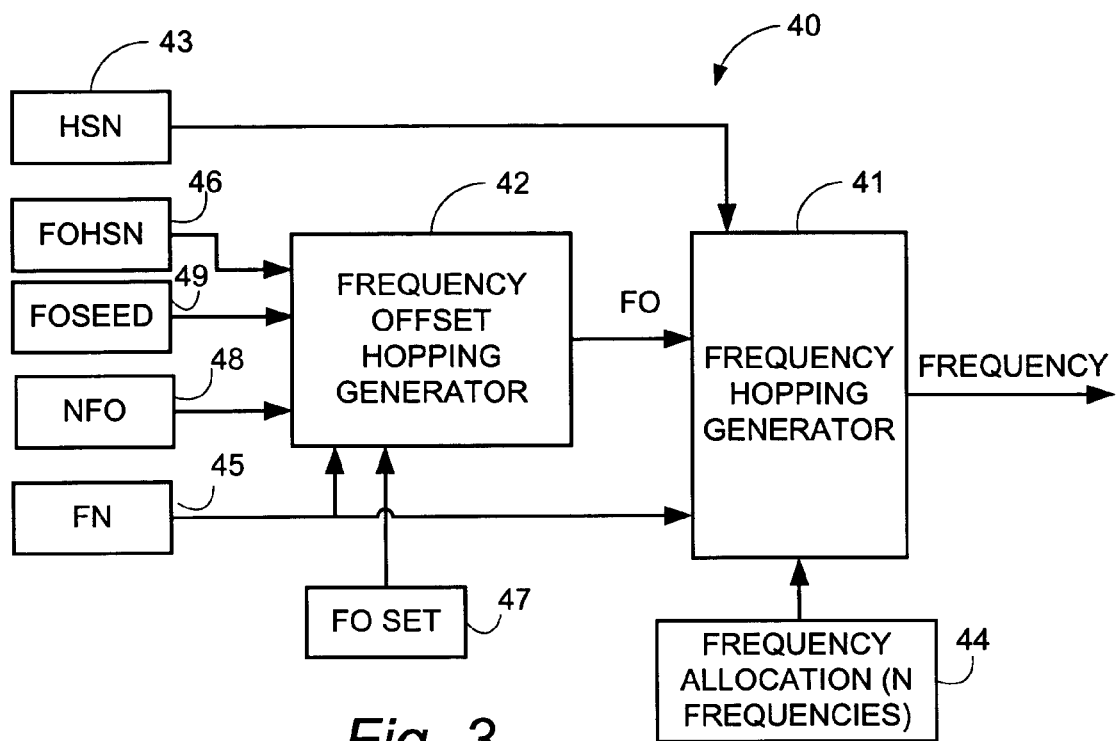
FIG. 3 is a schematic view of an example frequency hopping sequence generation system which utilizes variable frequency offsets for communication between a network node and a mobile station.

FIG. 3 shows such an example frequency hopping sequence generation system 40 which utilizes variable frequency offsets for communication between a network node and a mobile station. As explained subsequently, the frequency hopping sequence generation system 40 may be in either the network node or the mobile station, and compatible versions of frequency hopping sequence generation system 40 are employed in both the network node and the mobile stations in communication with the network node.

The frequency hopping sequence generation system 40 includes a frequency hopping generator 41 which receives a frequency offset (FO) for each frame from frequency offset hopping generator 42. For each time step (e.g., frame), the frequency hopping generator 41 receives the following inputs: a hopping sequence number (HSN) (as depicted by block 43); a frequency allocation of set of "N" number of frequencies used for frequency hopping in the cell (as depicted by block 44); a counter or frame number (FN) which clocks the frequency hopping (as depicted by block 45); and, the frequency offset (FO) which is provided by frequency offset hopping generator 42.

Concerning certain inputs to frequency hopping generator 41, in one example implementation the hopping sequence number (HSN) is typically an integer value from 0 to 63 inclusive. Of these HSN values, 1-63 yields different pseudo-random output sequences, while HSN=0 (not utilized in the present discussion) yields cyclic sequences. The hopping sequence number (HSN) is typically set on a per cell basis. The FN (Frame Number) is generally increased by one for each time step (or transmission burst). The Frame Number (FN) restarts at 0 when FN reaches a large value (e.g., FNMAX).

An important input to the frequency hopping generator 41 is the frequency offset (FO) which is provided by frequency offset hopping generator 42. The frequency offset (FO) is an integer in the range 0 through N−1 (N being the number of possible frequency offsets in a set of possible frequency offsets). In frequency hopping generator 41 the frequency offset (FO) is added (modulo N) to the basic sequence determined by HSN and N. Typically, different mobile stations in a cell (with equal HSN) employ different frequency offsets in order to avoid frequency collisions between them. In conventional (GSM) frequency hopping, a mobile station uses the same frequency offset (FO) throughout a given session. The person skilled in the art will recognize that the frequency offset (FO) is akin to the Mobile Allocation Index Offset (MAIO) employed in GSM, but is generated by frequency offset hopping generator 42 in order to be a variable frequency offset to achieve the advantageous operation herein described.

The frequency offset hopping generator 42 is shown in FIG. 3 as receiving (for each time step, e.g., frame) the following inputs: the counter, time index, or frame number (FN) which clocks the frequency hopping (as depicted by block 45); an integer FOHSN (depicted by block 46); the set of frequency offsets (FOs) (depicted by block 47); a number NFO (depicted by block 48) which advises of the number of frequency offsets (FOs) in the set; and, a number or seed known as FOSEED (depicted by block 49). For each time step, e.g., for each time frame, the frequency offset hopping generator 42 outputs its frequency offset (FO). Thus, in contrast to conventional practice, as explained below the magnitude of the frequency offsets (FO) generated and output for a mobile station varies based on the time index,e.g., the mobile station dose not use the same frequency offset (FO) throughout a given session.

Thus, the frequency hopping sequence generation system 40 which includes the frequency offset hopping generator 42 generates the variable frequency offsets during a clocking of a time index (e.g., FN) and as a function of the time index to determine a frequency hopping sequence for use in communication between a mobile station and a network node. Whereas in other systems frequency offsets may be dependent upon parameters that are predetermined or pre-assigned, the frequency hopping sequence generation system 40 herein described generates the variable frequency offsets on the fly as a function of the time index (and parameters specified at call setup).

The integer FOHSN (depicted by block 46) serves as a frequency offset hopping sequence number and is assigned to a mobile station for yielding a unique pseudo-random sequence. In one example implementation, the integer FOHSN is set on a per cell basis and has a value in a range of from 1 to 63. Once assigned, a mobile station uses the same FOHSN through-out the session.

The set of frequency offsets (FOs) depicted by block 47 are allocated to a specific user (mobile station) during a session. The number NFO advises of the number of frequency offsets (FOs) in the set. The FO set may be common for all mobiles in a cell but may as well be set individually for different mobiles. In an embodiment in which a mapping occurs, it is necessary that the FOs be sorted in ascending order so that the mapping from a FO index (FOI) to a FO be done correctly.

The FOSEED parameter (depicted by block 49) is used to avoid frequency collisions between mobiles with equal HSN and FOHSN and equal allocations of FOs and frequencies. A mobile station uses the same FOSEED throughout a session.

The output of frequency offset hopping generator 42 is the frequency offset (FO). The frequency offset (FO) is an integer which is applied to frequency hopping generator 41.

Figure 4:
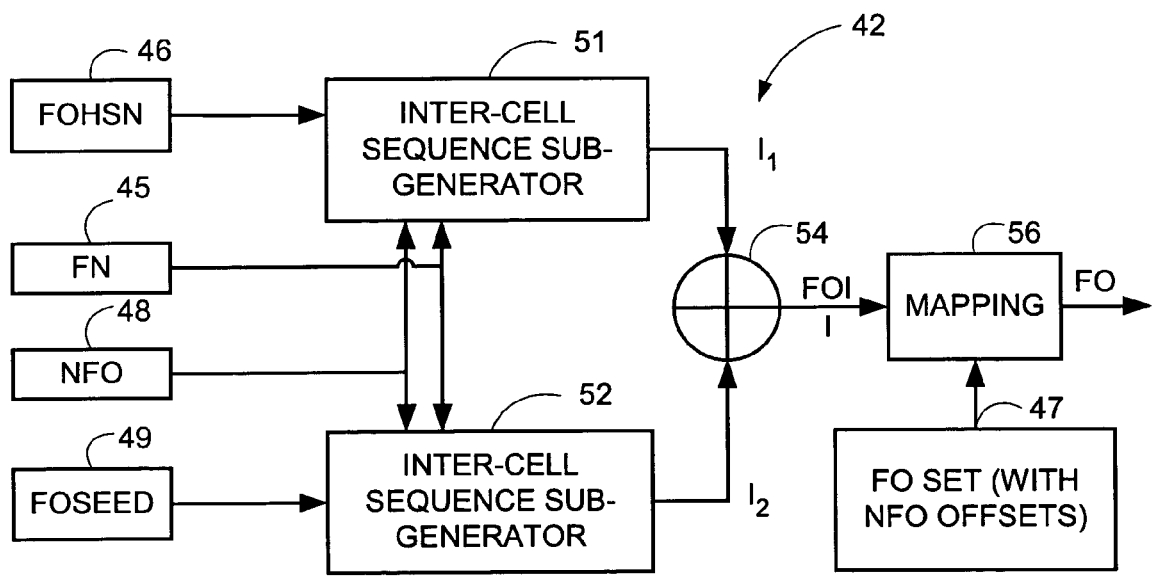
FIG. 4 is a schematic view of an example frequency offset hopping generator included in the frequency hopping sequence generation system of FIG. 3.

As shown in FIG. 4, the frequency offset hopping generator 42 has two components: inter-cell sequence sub-generator 51 and intra-cell component sub-generator 52. The inter-cell sequence sub-generator 51 generates a first or inter-cell component $I_1$ of a frequency offset index (FOI); the intra-cell component sub-generator 52 generates a second or intra-cell component $I_2$ of the frequency offset index (FOI). Both the inter-cell component $I_1$ and the intra-cell component $I_2$ are integers in the range 0 through NFO-1.

The frequency offset hopping generator 42 further comprises a modulo NFO adder 54 and a mapping unit 56. The mapping unit 56 has access to the set of frequency offsets (FOs) (depicted by block 47). For each time step (e.g., each frame), inter-cell sequence sub-generator 51 and intra-cell component sub-generator 52 produce the respective inter-cell component $I_1$ and the intra-cell component $I_2$, which are combined by modulo NFO adder 54. Specifically, modulo NFO adder 54 performs the operation indication by Expression 1 to give an frequency offset index (FOI, or I). The frequency offset index I is an integer in a range of 0 through NFO-1.

$$I=(I_1+I_2) \bmod NFO \quad \text{Expression 1}$$

Figure 5:
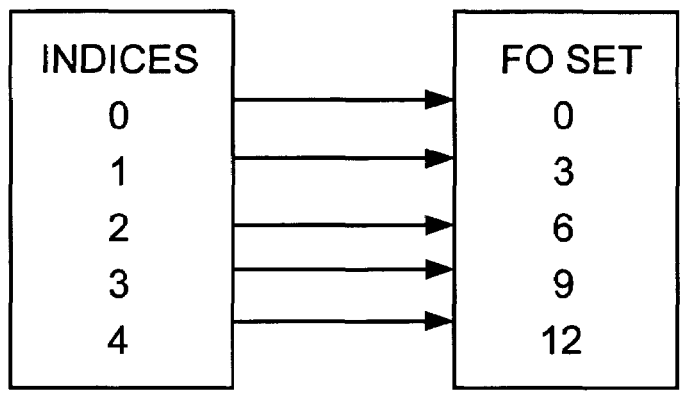
FIG. 5 is a diagrammatic view depicting an example operation of a mapping unit included in the frequency offset hopping generator of FIG. 4.

For each time step, the frequency offset index (FOI) obtained by modulo NFO adder 54 is applied to mapping unit 56. An example scenario of operation of mapping unit 56 is illustrated by FIG. 5. In other words, the mapping unit 56 maps the frequency offset index (FOI) to the set of sorted (ascending order) FOs that are given in the FO set (depicted by block 47). Thus, mapping unit 56 obtains from the frequency offset set (represented by block 47) an appropriate frequency offset (FO) in view of the frequency offset index (FOI). For the particular example mapping arrangement shown in FIG. 5, frequency offset index (FOI) of 0 results in mapping unit 56 providing a frequency offset (FO) of 0. From FIG. 5, it can further be seen that the following other mappings exist: when FOI=1, frequency offset (FO)=3; when FOI=2, FO=6; when FOI=3, FO=9; and, when FOI=4, FO=12. It will be appreciated that the example of FIG. 5 is for a scenario in which NFO equals five. The particular value of NFO and the mappings illustrated in FIG. 5 are exemplary only and can vary for other implementations.

For each time step, the frequency offset (FO) outputted by mapping unit 56 is applied, as the ultimate output from frequency offset hopping generator 42, to frequency hopping generator 41. The frequency hopping generator 41 adds the frequency offset (FO), modulo the number of frequencies N, to a basic frequency hopping sequence (determined from the hopping sequence number HSN), to provide a mobile-specific sequence.

The person skilled in the art will appreciate that the functions of the frequency hopping sequence generation system 40, including one or both of frequency hopping generator 41 and frequency offset hopping generator 42, as well as the functions of inter-cell sequence sub-generator 51 and/or intra-cell component sub-generator 52, may be implemented using individual hardware circuits, using software functioning in conjunction with a suitably programmed digital microprocessor or general purpose computer, using an application specific integrated circuit (ASIC), and/or using one or more digital signal processors (DSPs).

Sub-Generators

As mentioned above, frequency offset hopping generator 42 comprises both the inter-cell sequence sub-generator 51 for generating the inter-cell component $I_1$ and the intra-cell component sub-generator 52 for generating the intra-cell component $I_2$. A reason for using two components and combining them with a simple addition (on the modulus using mapping unit 56) is to handle inter-cell and intra-cell requirements separately and to ensure that desirable statistical properties (random hopping) provided by one or both components are preserved. The inter-cell component $I_1$ provides interference diversity while the intra-cell component $I_2$ provides orthogonal (non-overlapping) sequences with adjacent collision diversity. In other words, the inter-cell component $I_1$ (which is common for all mobiles in a cell) takes care of inter-cell interference (interference diversity by FO collision "diversity" by random hopping), whereas intra-cell component $I_2$ takes care of intra-cell interference (provides orthogonal hopping sequences with adjacent collision diversity). The combined properties will essentially be the sum of the individual properties of the components.

Inter-Cell Sequence Sub-Generator

In an example embodiment, the inter-cell sequence sub-generator 51 is, e.g., a pseudo-random number generator clocked by the counter FN. The inter-cell sequence sub-generator 51 generates the inter-cell component $I_1$ to have a value between 0 and NFO-1. The inter-cell sequence sub-generator 51 has the following requirements: (1) the sequence it is used to generate is uniquely determined by the FOHSN parameter; (2) sequences with different FOHSNs should coincide one out of NFO time steps, over the long run. In addition, in an illustrated embodiment the inter-cell sequence sub-generator 51 satisfies the following conditions: (3) It takes three input arguments: FOHSN, NFO, FN; (4) it outputs an integer in the range 0 through NFO-1; and (5) it is pseudo-random with a uniform distribution over the NFO integers.

There are several available types of pseudo-random number generators which can be utilized in according with the foregoing criteria. One example of such a pseudo-random number generator is the conventional GSM frequency hopping sequence generator described, e.g., in GSM Specification 05.02, which is incorporated herein by reference. For a generic pseudo-random generator G that takes two input arguments to form a unique seed, the inter-cell index $I_1$ at time FN for a mobile with parameter FOHSN can be written as Expression 2.

$$I_1(FN, FOHSN)=G(FN, FOHSN) \quad \text{Expression 2}$$

The inter-cell sequence sub-generator 51 is thus a basic frequency hopping generator of the same type as that specified for GSM. This means that it has inputs and an output of the same type. The internal mechanism of the generator is arbitrary as long as it fulfills some basic requirements of a random number generator, i.e. the output is uniformly distributed over a specified range of integers and different sequences (different hopping sequence numbers, HSNs) have a mutual correlation close to zero. Like the GSM generator, there may be certain parameter settings (e.g. certain HSNs) that yield non-random (e.g. cyclic) sequences. Such special output sequences may be used in the FO hopping method, although the basic idea is to use pseudo-random output.

Intra-Cell Sequence Sub-Generator

As explained above, the frequency hopping sequence generator 41 comprises a frequency offset hopping generator 42 which chooses the variable frequency offsets so that the frequency hopping sequence provides adjacent channel interference diversity. For each mobile station, the frequency offset hopping generator 42 determines a frequency offset index FOI which is mapped by mapping unit 56 to one of plural possible frequency offsets (see FIG. 5). The frequency offset index (and thus the corresponding frequency offset) is determined to provide the frequency hopping sequence with both interference diversity and orthogonality. As also described above, the frequency offset index has two components: inter-cell component $I_1$ and intra-cell component $I_2$. The intra-cell component $I_2$ is generated by an intra-cell component sub-generator 52.

The intra-cell sequences generated by intra-cell component sub-generator 52 are a set of orthogonal sequences and provide adjacent channel interference diversity which is obtained by ensuring that two intra-cell sequences do not give adjacent indices for successive frames or time steps, e.g. there is adjacent channel interference diversity. Adjacent channel interference diversity means that two mobile stations are not frequency "neighbors" constantly throughout the sessions. As explained below, the intra-cell component sub-generator can operate in either a "short sequences" mode or a "long sequences" mode.

Short Sequences Mode

In the short sequences mode, a frequency hopping sequence allocated to a mobile station is repeated cyclically. A short sequence utilized in the short sequences mode is deterministic and periodic, as illustrated by the basic intra-cell sequence of FIG. 6. As understood from FIG. 6, the frame number (FN) counter and the mobile-specific FOSEED parameter determine the intra-cell component $I_2$. In the short sequences mode, all mobile stations in a cell use the same basic sequence, but with a time shift given by the parameter FOSEED. For FOSEED equal to 0, 1, . . . , NFO-1, NFO number of orthogonal sequences are provided.

In one example embodiment which implements the short sequences mode, the intra-cell component sub-generator 52 evaluates Expression 3 to determine intra-cell component $I_2$.

$I_2(FN, FOSEED) = S(1+(FN+FOSEED) \bmod NFO)$   Expression 3

In Expression 3, S is a basic sequence of 0, 2, 4, . . . $K_1$, $K_2$, $K_2-2$, . . . 3, 1. In the basic sequence of S, the values of K, and $K_2$ are provided by Expression 4 and Expression 5, respectively.

$, K_1 = 2*[(NFO-1)/2]$   Expression 4

$K_2 = 2*[(NFO)/2]-1$   Expression 5

The parameters utilized in Expression 3, Expression 4, and Expression 5 have been previously explained. In brief, FN is a time index; FOSEED is a unique integer assigned to a mobile station at call setup; and NFO is a number of frequency offsets in a set of possible frequency offsets. The output of the intra-cell component sub-generator, $I_2$, is an integer in the range 0 through NFO-1.

Figure 6:
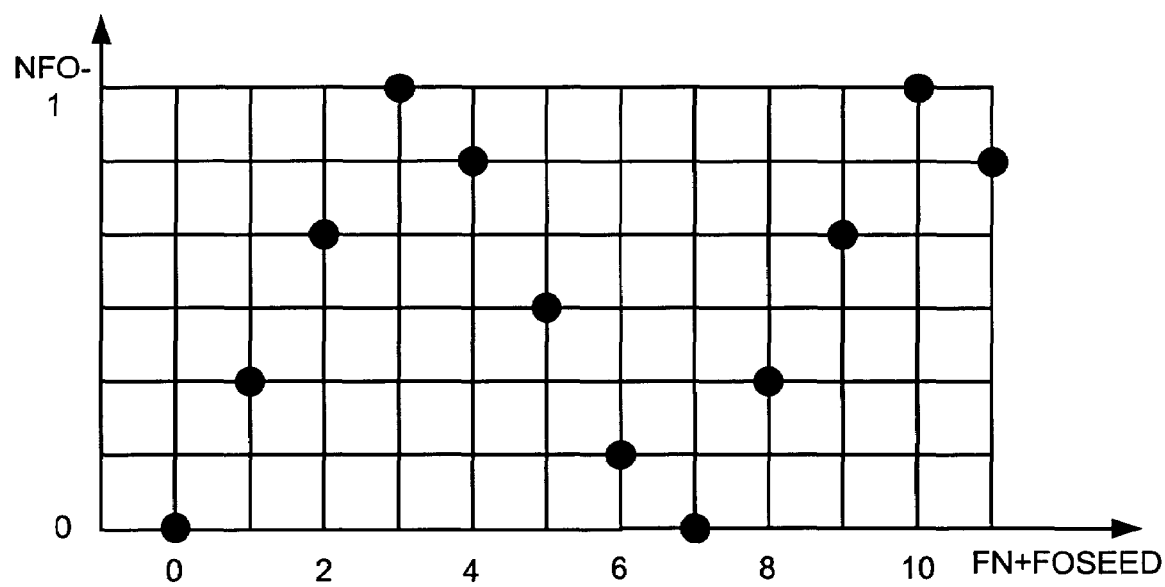
FIG. 6 is a diagrammatic view illustrating an example periodic short sequence generated by an intra-cell component sub-generator of the frequency offset hopping generator of FIG. 4.

Table 1 illustrates a short sequences mode scenario (one period) for the sequence of FIG. 6 in which NFO is equal to seven. Table 1 particularly illustrates the intra-cell component $I_2$ for time steps $I_2$(O) through $I_2$(6) for mobile stations having seven different FOSEED values. Each row of Table 1 shows the intra-cell component $I_2$ for a given FOSEED for each of the time steps. For example, row one of Table 1 shows the values 0, 2, 4, 6, 5, 3, 1 for the time steps 0-6, respectively, for a mobile station having FOSEED=0.

TABLE 1

SHORT SEQUENCES MODE EXAMPLE

| FOSEED | $I_2(0)$ | $I_2(1)$ | $I_2(2)$ | $I_2(3)$ | $I_2(4)$ | $I_2(5)$ | $I_2(6)$ | # of adjacent collisions with FOSEED 0 |
|---|---|---|---|---|---|---|---|---|
| 0 | 0 | 2 | 4 | 6 | 5 | 3 | 1 | — |
| 1 | 2 | 4 | 6 | 5 | 3 | 1 | 0 | 2 |
| 2 | 4 | 6 | 5 | 3 | 1 | 0 | 2 | 2 |
| 3 | 6 | 5 | 3 | 1 | 0 | 2 | 4 | 3 |
| 4 | 5 | 3 | 1 | 0 | 2 | 4 | 6 | 3 |
| 5 | 3 | 1 | 0 | 2 | 4 | 6 | 5 | 2 |
| 6 | 1 | 0 | 2 | 4 | 6 | 5 | 3 | 2 |

The rightmost column of Table 1 shows the number of adjacent collisions with the first sequence (FOSEED=0) for a mobile station with a given FOSEED. For example, considering the row FOSEED=1, there are only two adjacent collisions with the row FOSEED=0. A first such adjacent collision occurs at time step 3, wherein $I_2(3)=6$ for the first row (FOSEED=0) is adjacent $I_2(3)=5$ for the second row (FOSEED=1), since 6 is adjacent 5. A second such adjacent collision occurs at time step 6, wherein $I_2(6)=1$ for the first row (FOSEED=0) is adjacent $I_2(6)=0$ for the second row (FOSEED=1), since 1 is adjacent 0. As illustrated in Table 1, most pairs of sequences have two adjacent collisions with FOSEED=0, and just a few pairs have three adjacent collisions. In determining the number of adjacent collisions, it should be kept in mind that $I_2(k)=6$ is considered to be adjacent to $I_2(k)=0$ for differing FOSEED values.

The optimal choice of sequences would minimize the maximal number of adjacent collisions among all pairs, which can be shown to be three (irrespective of the value of NFO). The suggested sequence fulfills this for an odd number of frequency offsets (NFO odd). If NFO is even, the suggested sequence is slightly suboptimal since it gives four adjacent collisions between certain pairs (but two adjacent collisions for most pairs).

A possible disadvantage of using these short sequences is that certain pairs will always experience, e.g., three adjacent collisions per period (per NFO time steps), while other pairs will always experience two adjacent collisions. Another property, which might be desirable to avoid, is that the difference between two short sequences, e.g., FOSEED=0 and FOSEED=1, does not vary much. For some systems, such as GSM frequency hopping, which has collision rates that for certain hopping sequences are sensitive to frequency offset differences, it is more desirable to have a more variable frequency offset (FO) difference.

Long Sequences Mode

In view of the foregoing possible disadvantage(s) of the short sequences mode, it is preferred to use the basic sequences given by S, but after each period to change to a shifted version of the sequence used in the preceding period. In other words, for NFO successive periods (each comprising NFO time steps), a new orthogonal sequence among those available (see Table 1) is utilized. The switching is accomplished so that two mobile stations never use equal sequences during the same period. The switching is performed in an irregular manner so that increased variation of frequency offset (FO) difference is obtained. The basic sequence S is used to determine which sequence to use for which sub-period of the full period (comprising NFO subperiods).

Table 2 shows an example long sequences mode of operation for sub-periods K=0 through K=6 for one mobile station (the mobile station having FOSEED=0), and for a case in which NFO=7. Table 2 shows one period, which includes seven sub-periods (each sub-period being a row of Table 2), taken in the order given by (FN div NFO), i.e., K=0, 2, 4, 6, 5, 3, 1.

TABLE 2

Long Sequences Mode Example

| K (sub-period) | $I_2(0)$ | $I_2(1)$ | $I_2(2)$ | $I_2(3)$ | $I_2(4)$ | $I_2(5)$ | $I_2(6)$ |
|---|---|---|---|---|---|---|---|
| 0 (FN div NFO = 0) | 0 | 2 | 4 | 6 | 5 | 3 | 1 |
| 1 (FN div NFO = 6) | 2 | 4 | 6 | 5 | 3 | 1 | 0 |
| 2 (FN div NFO = 1) | 4 | 6 | 5 | 3 | 1 | 0 | 2 |
| 3 (FN div NFO = 5) | 6 | 5 | 3 | 1 | 0 | 2 | 4 |
| 4 (FN div NFO = 2) | 5 | 3 | 1 | 0 | 2 | 4 | 6 |
| 5 (FN div NFO = 4) | 3 | 1 | 0 | 2 | 4 | 6 | 5 |
| 6 (FN div NFO = 3) | 1 | 0 | 2 | 4 | 6 | 5 | 3 |

Thus, in Table 2, K gives the order of the orthogonal sub-sequences. The mobile station-specific parameter FOSEED is used to distribute different mobile stations over the NFO orthogonal sequences available during a period.

From the foregoing it is understood that, in another example embodiment which utilizes the long sequences mode, the intra-cell component sub-generator 52 evaluates Expression 6 to determine intra-cell component $I_2$.

$$I_2(FN, FOSEED)=S(1+(FN+K) \bmod NFO) \quad \text{Expression 6}$$

In Expression 6, S is again a basic sequence of 0, 2, 4, ... $K_1$, $K_2$, $K_2-2$, ... 3, 1 as previously defined, but wherein K is given by Expression 7. In Expression 7, "div" means integer division, i.e., x div y is equivalent to [x/y].

$$K=S(1+(FOSEED+FN \text{ div } NFO) \bmod NFO) \quad \text{Expression 7}$$

Thus, in the long sequences mode, rather than repeat the same short sequence every cycle, another one of the orthogonal sequences is employed according to a suitable cyclic scheme for switching between different short sequences for different mobiles. The long sequences mode renders adjacent frequency collision rates between two sequences with equal FOHSN independent of the choice of the two different FOSEEDs selected. On the other hand, the short sequences mode yields higher collision rates between certain pairs than between other pairs.

EXAMPLES

FIG. 7A-FIG. 7E; FIG. 8A-FIG. 8E; and, FIG. 9A-FIG. 9E illustrate three separate examples of frequency hopping with the variable frequency offset (FO) facilitated by frequency hopping sequence generation system 40, and particularly by frequency offset hopping generator 42. FIG. 7A-FIG. 7E collectively illustrate a first example; FIG. 8A-FIG. 8E collectively illustrate a second example; FIG. 9A-FIG. 9E collectively illustrate a third example. In all three examples, frequency hopping is performed over N=5 contiguous frequencies, labeled along the vertical (Y) axis as frequencies 0, 1, 2, 3 and 4. The horizontal (X) axis of the figures corresponds to increasing time step (e.g., increasing FN).

In the examples, for sake of simplicity there is a one-to-one mapping of frequency offset index (FOI) to frequency offsets (FOS) as follows: FOI=0 maps to FO=0; FOI=1 maps to FO=1; FOI=2 maps to FO=2; FOI=3 maps to FO=3; and FOI=4 maps to FO=4.

Each example features two frequency hopping sequences. A first of the illustrated frequency hopping sequences (for, e.g., a first mobile station MS1 having FOSEED=0) is depicted by asterisk symbols in the graphs of the figures; a second of the illustrated frequency hopping sequences (for, e.g., a second mobile station MS2 having FOSEED=1) is depicted by circular symbols in the graphs of the figures.

The first or "A" figure of each example (i.e., FIG. 7A, FIG. 8A, and FIG. 9A) shows for the respective example the inter-cell component $I_1$ value generated by inter-cell sequence sub-generator 51. The second or "B" figure of each example (i.e., FIG. 7B, FIG. 8B, and FIG. 9B) shows for the respective example the intra-cell component $I_2$ value generated by intra-cell component sub-generator 52. The third or "C" figure of each example shows for the respective example the frequency offset index (FOI) or combined I value computed by modulo NFO adder 54 as the combination of inter-cell component $I_1$ and intra-cell component $I_2$. The fourth or "D" figure of each example shows for the respective example the frequency offset (FO) sequence resulting from the mapping performed by mapping unit 56 based on the frequency offset index (FOI) or I value. The fifth or "E" figure of each example shows for the respective example the resultant or final frequency hopping sequence outputted by frequency hopping generator 41 of frequency hopping sequence generation system 40.

FIG. 7A-FIG. 7E show the generation of two example orthogonal frequency hopping sequences employing the method of short intra-cell sequences and having variable offset from one another. The intra-cell sequences are periodic (period=NFO=5 steps). In the example of FIG. 7A-FIG. 7E, N=NFO=5; HSN=1; FOHSN=1; the FO set consists of frequencies {0, 1, 2, 3, 4}; FOSEED=0 for the first mobile station and FOSEED=1 for the second mobile station.

Figure 7A:
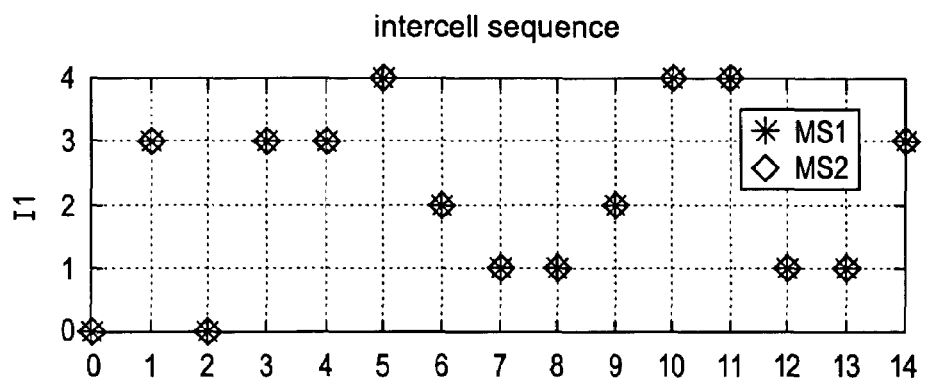
FIG. 7A-FIG. 7E show generation of two example orthogonal frequency hopping sequences employing the method of short intra-cell sequences and having variable offset from one another.
Figure 7B:
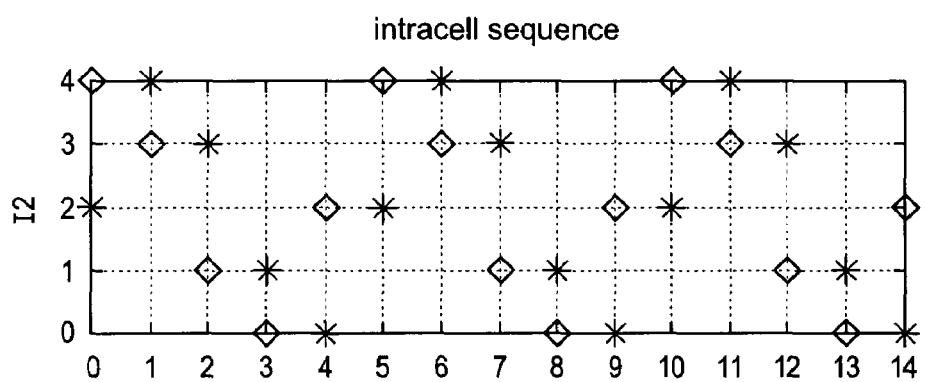

FIG. 7A and FIG. 7B show that, for frame FN=0, the first mobile station has inter-cell component $I_1=0$ and intra-cell component $I_2=2$, while for frame FN=0, the second mobile station has inter-cell component $I_1=0$ and intra-cell component $I_2=4$. The determination of intra-cell component $I_2$ results from evaluation of Expression 3.

Figure 7C:
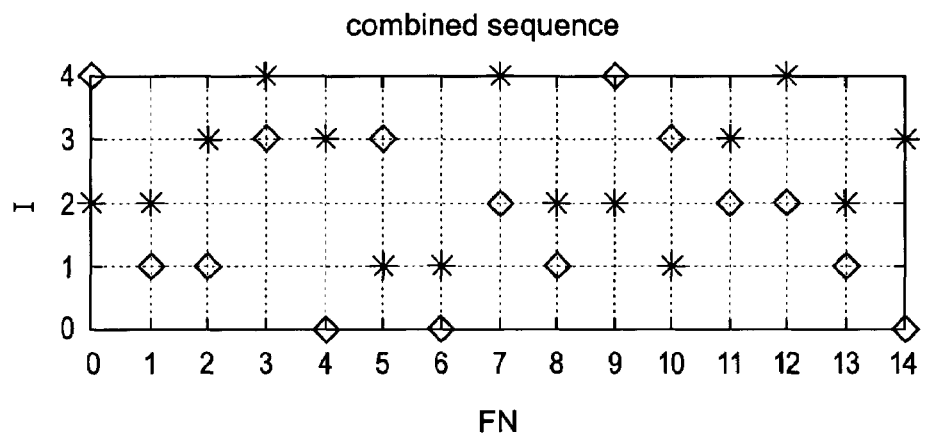
Figure 7D:
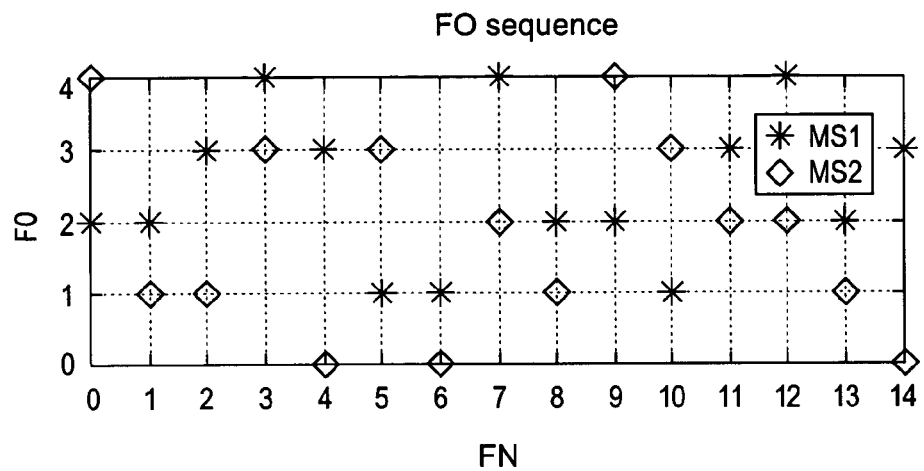

FIG. 7C shows that the frequency offset index (FOI) or I value (which equals $I_1+I_2$) for the first mobile station is 0+2=2; while the FOI or I value for the second mobile station is 0+4=4. In view of the simplified mapping, the frequency offset (FO) determined by mapping unit 56 for the first mobile station is 2 while the frequency offset (FO) determined by mapping unit 56 for the second mobile station is 4, as illustrated by FIG. 7D.

Figure 7E:
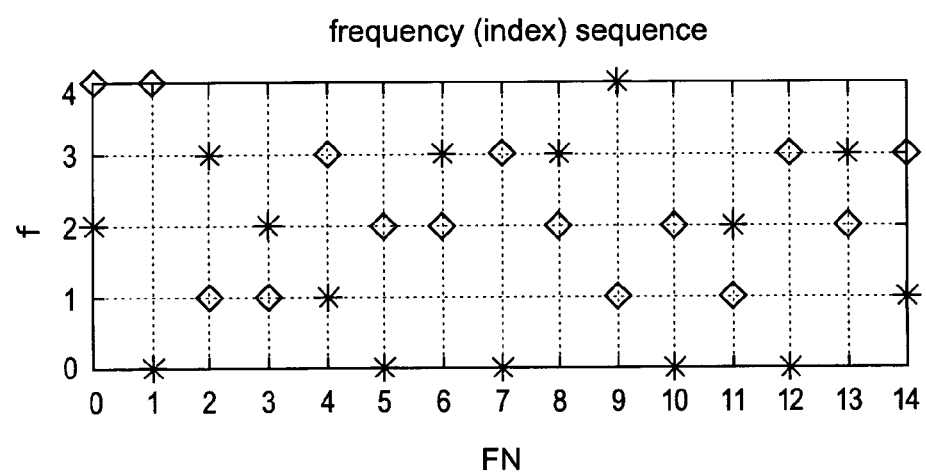
Figure 8A:
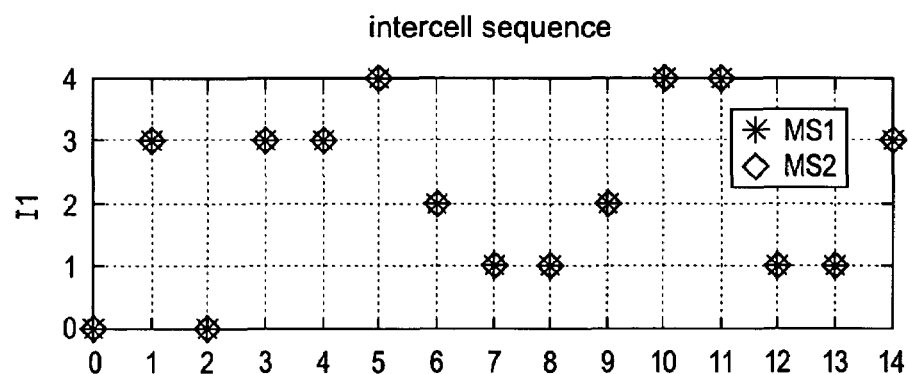
FIG. 8A-FIG. 8E show the generation of two example orthogonal frequency hopping sequences employing the method of long intra-cell sequences.
Figure 8B:
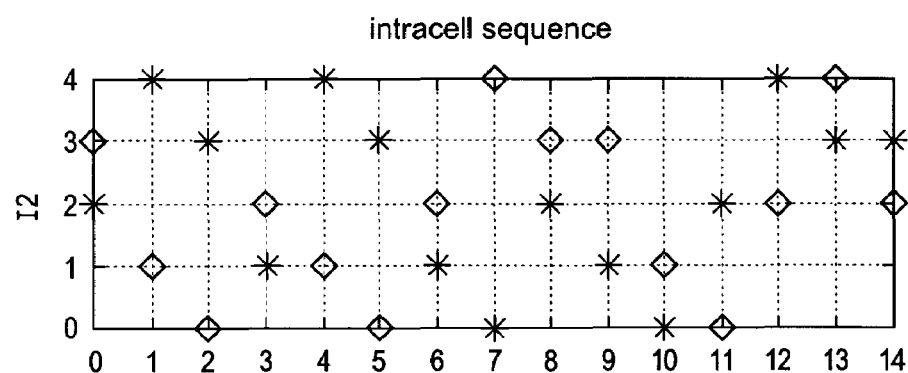
Figure 8C:
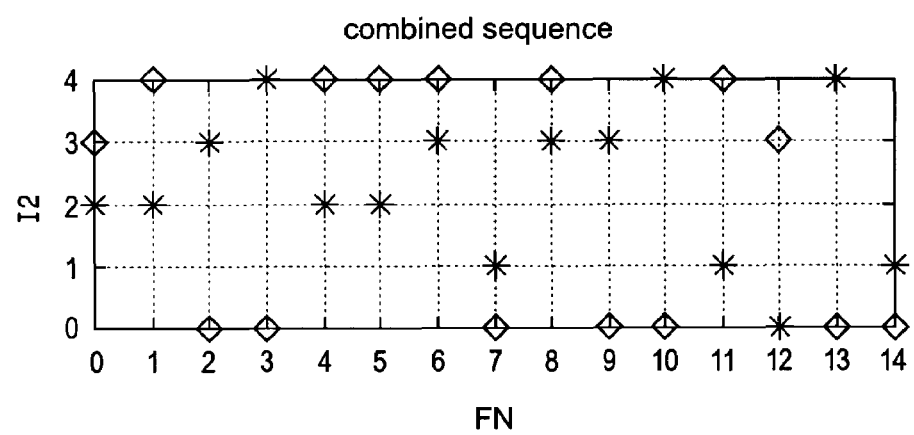
Figure 8D:
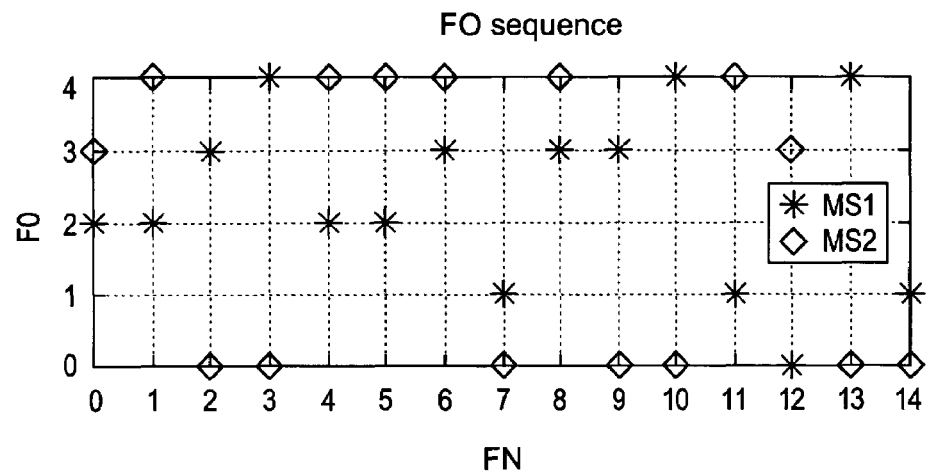
Figure 8E:
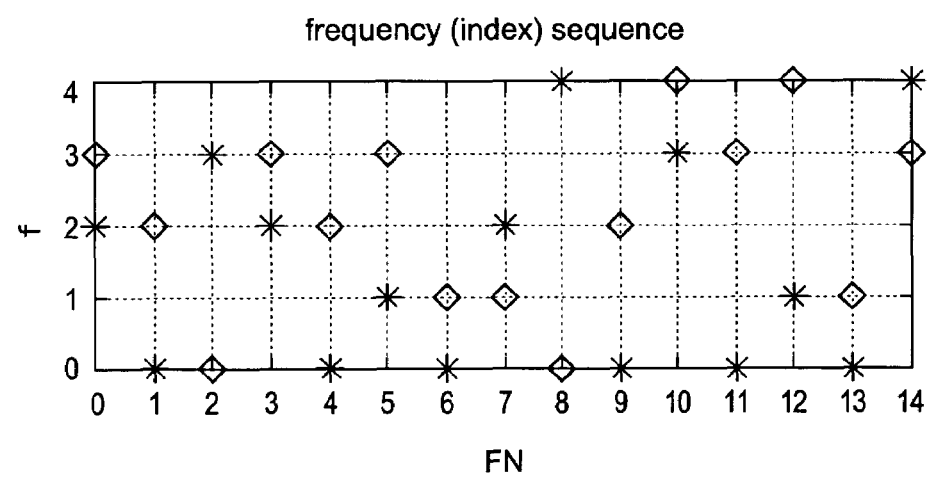
Figure 9A:
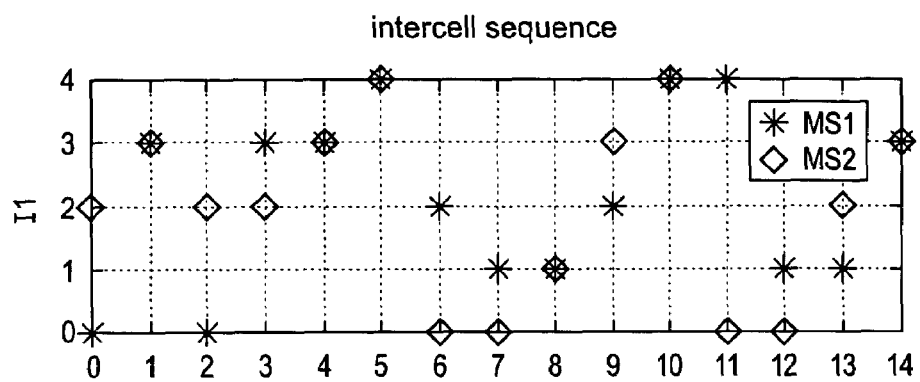
FIG. 9A-FIG. 9E show the generation of two example non-orthogonal frequency hopping sequences obtained with a parameter setting that yields random collisions between the FO sequences and the final frequency hopping sequences.
Figure 9B:
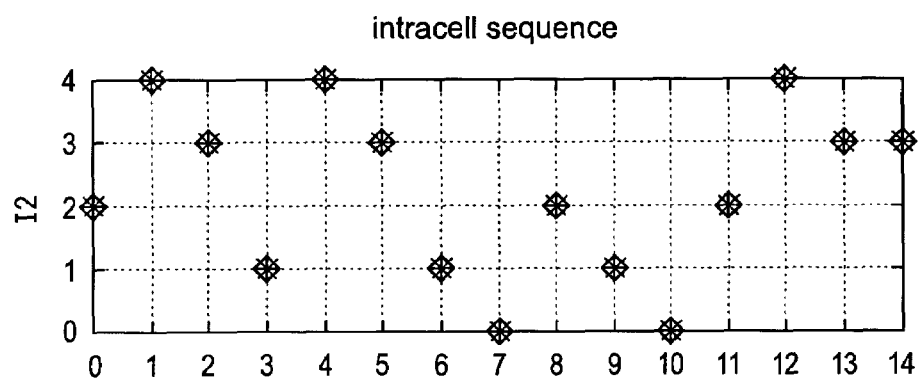
Figure 9C:
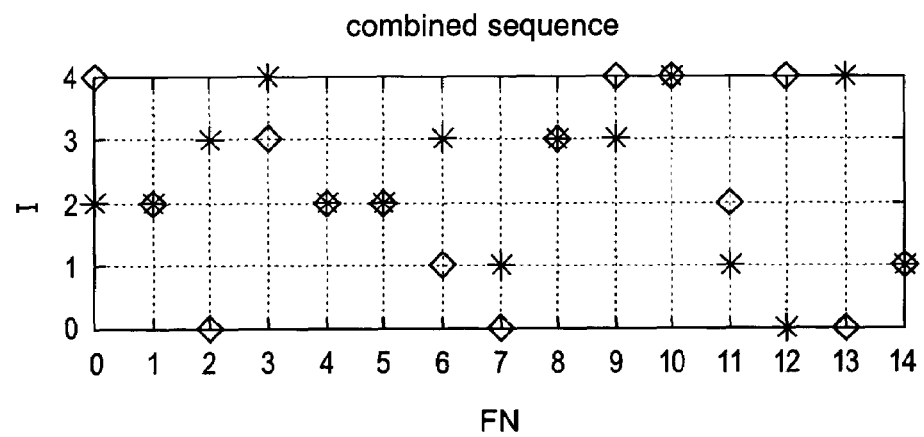
Figure 9D:
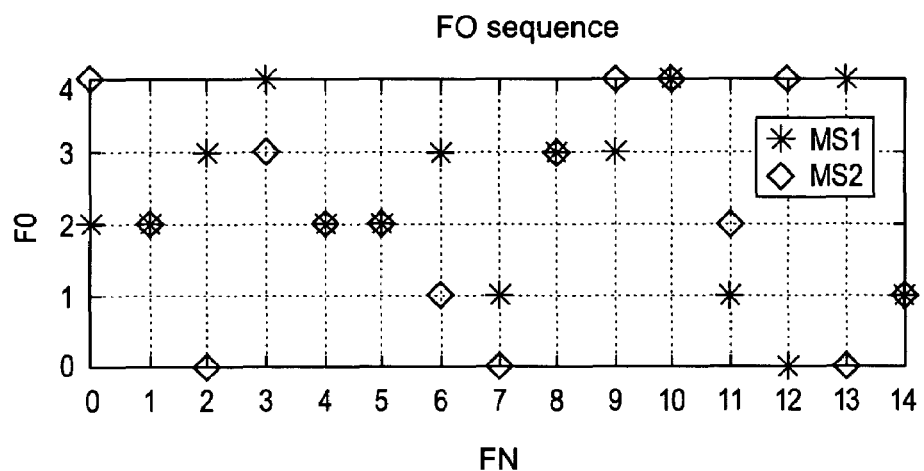
Figure 9E:
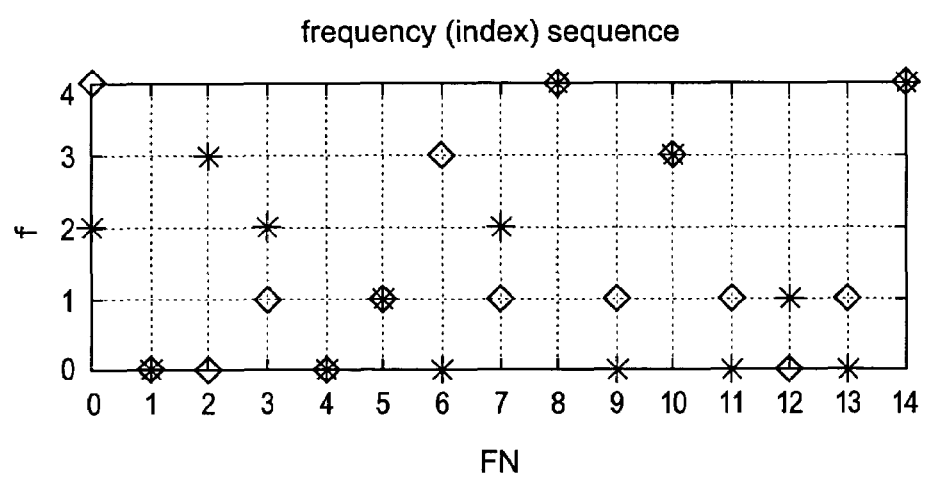

Assuming that HSN=1 represents a frequency hopping sequence of {0, 3,0, 3, 3, 4, . . . } for frame FN=0 the first mobile station (which has the FO value of 2) is allocated the frequency 2, while the second mobile station (which has the FO value of 4) is allocated the frequency 4 (see FIG. 7E). For FN=1, FIG. 7D shows that the first mobile station has FO=2 and the second mobile station has FO=1, so that these FO values added to the second member of the sequence {3} results the first mobile station being assigned frequency (2+3) mod 5=0 for time FN=1, while the second mobile station is assigned frequency (1+3) mod 5=4 for time FN=1. The basic hopping sequence for all time steps is: 0, 3, 0, 3, 3, 4, 2, 1, 1, 2, 4, 4, 1, 1, 3.

FIG. 8A-FIG. 8E show the generation of two example orthogonal frequency hopping sequences employing the method of long intra-cell sequences, with the same parameter settings as in FIG. 7A-FIG. 7E (N=NFO=5; HSN=1;

FOHSN=1; the FO set consists of frequency offsets {0, 1, 2, 3, 4}; FOSEED=0 for the first mobile station and FOSEED=1 for the second mobile station). The intra-cell sequences now have a period longer than the number of time steps shown. The result is two orthogonal sequences with variable offset from each other.

FIG. 9A-FIG. 9E show the generation of two example non-orthogonal frequency hopping sequences obtained with a parameter setting that yields random collisions between the FO sequences and the final frequency hopping sequences. The example of FIG. 9A-FIG. 9E has the same parameter settings as the prior two examples except that they use different FOHSNs (MS2 is now using FOHSN=2 instead of FOHSN=1).

Functional Expressions

Some of the concepts described above are now described from a functional perspective. In this regard, the new frequency offset hopping method generates its variable frequency offset as a function of six parameters. In particular, according to Expression 8, the frequency offset FO(k) for time step k=1,2, ... is $$FO(k)=f_0(HSN, g(FOHSN, FOSEED, FO \text{ set}, FN(k)), N, FN(k))$$ Expression 8 where $f_0$ is the functionality provided by frequency hopping generator 41, and g is the functionality provided by frequency offset hopping generator 42.

The procedure performed by frequency offset hopping generator 42 to calculate a FO index (FOI) which is mapped to one of the FOs in the FO set is represented by Expression 9.

$$FO(k)=g(FOHSN, FOSEED, FO \text{ set}, FN(k))=\text{element } FOI+1 \text{ in the } FO\text{set}$$ Expression 9:

for time steps k=1, 2, . . . , where FOI takes values in {0, 1, . . . , NFO-1}. For a mapping implementation, it is important that the elements in the FO set be sorted in ascending order.

The FO index FOI for burst k is given by two components $I_1$ and $I_2$ as indicated in Expression 10 for k=1, 2, . . . .

$$FOI(k) =$$ Expression 10
$$(I_1(k) + I_2(k)) \bmod NFO = (g_1(FOHSN, NFO, FN(k)) + g_2(FOSEED, FN(k), NFO)) \bmod NFO$$

As explained previously, a possible choice for the inter-cell component is to use the original (GSM 05.02) hopping algorithm reflected by Expression 11:

$$I_1=g_1(FOHSN, NFO, FN(k))=f_0(FOHSN, 0, NFO, FN(k))$$ Expression 11

Another possibility is to use a modified version of the original GSM hopping algorithm to get more random sequences. Yet another option is to use scrambling codes where the parameter FOHSN determines a unique code to be applied by a base station and by the mobile stations connected to it. Scrambling codes are used in WCDMA to obtain interference diversity.

When using the short sequences mode, a suggested intra-cell hopping sequence generator is deterministic and periodic, where the kth value is determined by a fixed sequence S,FN(k), and FOSEED which is assigned at call setup. The intra-cell sequence for such a short sequences mode is given by Expression 12.

$$I_2(k)=g_2(FN(k), NFO, FOSEED)=S(1+(FN+FOSEED) \bmod NFO)$$ Expression 12

The sequences (S) are constructed with respect to considerations as follows. In general, it is possible to generate at most NFO orthogonal sequences. Orthogonality of intra-cell sequences is necessary, since if two mobiles would at some time step use the same intra-cell sequence value, they would use the same FO and the same frequency (assuming they have the same FO set and frequency allocations). This is easily avoided by constructing the sequences so that orthogonality is obtained for different values of FOSEED. Regarding adjacent frequency collisions, if two mobiles at some time step use adjacent intra-cell sequence values (modulo NFO) they will use adjacent FOs if FO hopping is performed over adjacent FOs. They will in that case usually use adjacent frequencies if the mobile allocation consists of contiguous frequencies. The purpose of the suggested scheme (choice of S) is to obtain interference diversity with respect to adjacent frequencies (in addition to the orthogonality). Furthermore, the sequences (S) must be scalable so that the method can be used for any choice of NFO. These requirements are met by sequences either according to the short sequence mode or according to the long sequences mode.

For a long sequences mode, Expression 13 provides an alternative for determining the intra-cell component $I_2$.

$$g_2(FN(k), NFO, FOSEED)=S(1+(FN(k)+K) \bmod NFO)$$ Expression 13 where K=S(1+(FOSEED+FN(k) div NFO) mod NFO).

General Situations

Frequency hopping parameters can be chosen to avoid totally interference (using orthogonal frequency hopping sequences) or to smear out interference (sequences with random collisions). The new concept of frequency offset hopping, for variable frequency offset, as described above, adds parameters which increase the flexibility of combining orthogonality and interference diversity. In particular, the concept combines orthogonality with respect to (or elimination of) co-channel interference with interference diversity with respect to adjacent channel interference.

Without frequency offset hopping, there are two possibilities. A first possibility (situation A') is that frequency hopping (FH) sequence $S_1$ is orthogonal to FJ sequence $S_2$, i.e., $S_1 \perp S_2$, if $HSN_1=HSN_2$ and $FOSEED_1$ is not equal to $FOSEED_2$. A second (situation B') is that FH sequence $S_1$ is partially orthogonal to FH sequence $S_2$, i.e., $S_1 \perp_p S_2$, if $HSN_1$ is not equal to $HSN_2$ (collision probability p=1/N, N being the number of frequencies available (for frequency hopping) in each cell).

With frequency offset hopping, there are other possibilities. A first possibility (situation A) is that FH sequence $S_1$ is orthogonal to FH sequence $S_2$, i.e., $S_1 \perp S_2$, if either (situation A1): $HSN_1=HSN_2$ and there is no overlap of $FOset_1$ and $FOset_2$; or (situation A2) $HSN_1=HSN_2$, $FOset_1=FOset_2$, and $FOSEED_1$ is not equal to $FOSEED_2$. A second (situation B) is that FH sequence $S_1$ is partially orthogonal to sequence $S_2$, i.e., $S_1 \perp_p S_2$, if either: (situation B1) $HSN_1$ is not equal to $HSN_2$ (collision probability p=1/N, N being the number of frequencies available in each cell), or (situation B2) $HSN_1=HSN_2$ and $FOHSN_1$ is not equal to $FOHSN_2$ (p=1/NFO).

Co-channel interference is thus avoided if A1 or A2 apply. Co-channel interference diversity is obtained if situation B1, or situation B2, or both apply. The interference diversity is reduced if only situation B2 applies, and the number of FOs in the FOset is less than the number of frequencies. Both situation A1 and situation B2 can simultaneously apply to the same pair of sequences.

Adjacent channel interference is avoided if the FH sequences $S_1$ and $S_2$ satisfy the following conditions: $S_1 \perp S_2 - 1$, i.e. $S_1$ is orthogonal to $S_2$ shifted by $-1$, and $S_1 \perp S_2 + 1$, i.e. $S_1$ is orthogonal to $S_2$ shifted by $+1$, where the carrier frequency separation is 1 (in suitable units). For contiguous frequencies, this is obtained if either situation A1 or situation A2 hold with $FOset_2$ being shifted by $+1$ and $-1$ (modulo NFO).

Adjacent channel interference diversity (ACID) is obtained if either situation B1 or situation B2 applies, since $S_1 \perp_p S_2$ implies that $S_1 \perp_p S_2 - 1$ and $S_1 \perp_p S_2 + 1$. ACID is also provided by situation A2 due to the variable FO differences between FO hopping sequences generated for the same FOHSN.

Communication of Parameters Over Air Interface

Figure 10:
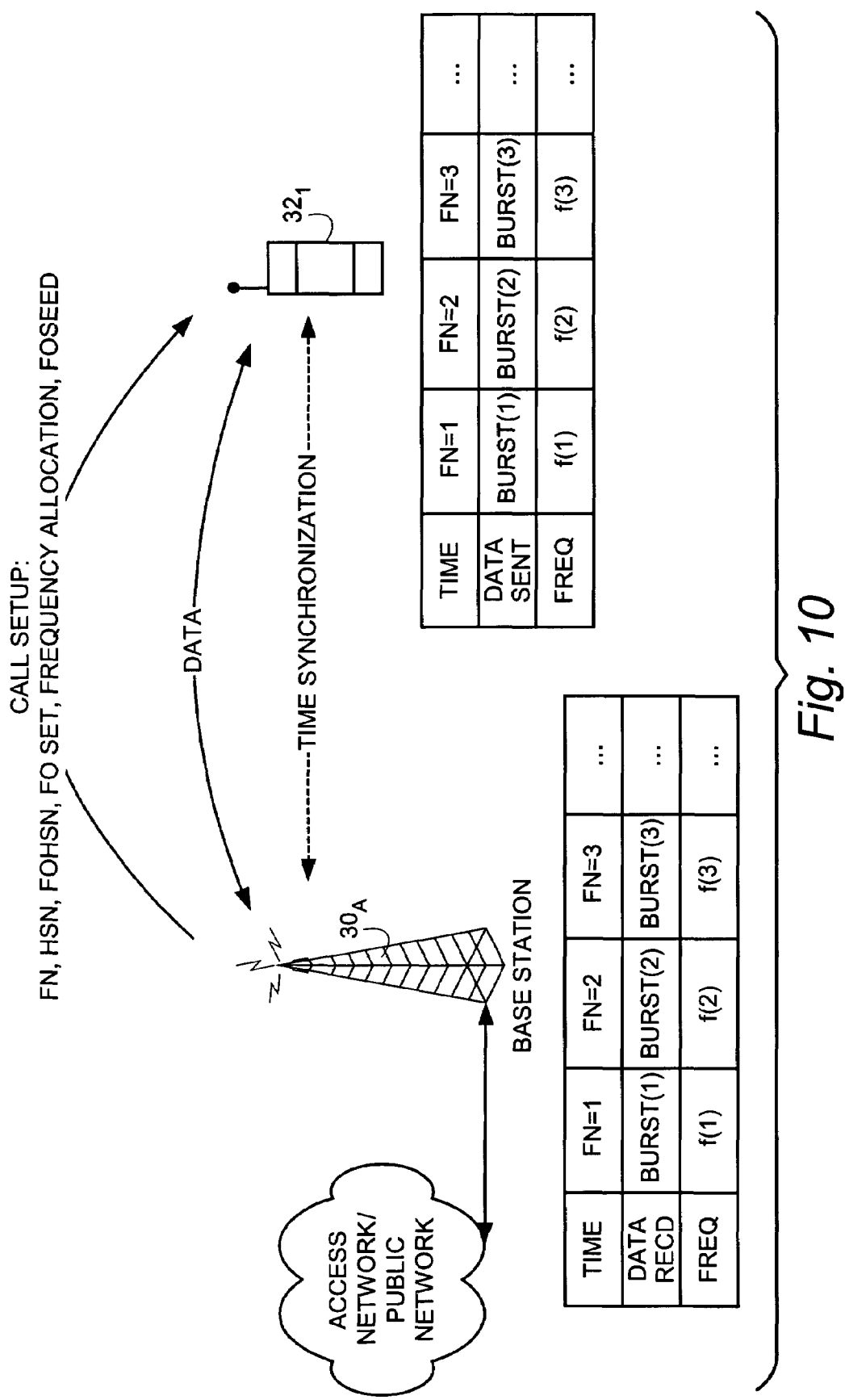
FIG. 10 is a schematic view illustrating location of a frequency hopping sequence generation system at a network node and location of a same or similar but compatible version of the frequency hopping sequence generation system at a mobile station, and downloading of parameters for facilitating frequency hopping with variable frequency offsets.

FIG. 10 illustrates that the frequency hopping sequence generation system can be located at a network node such as base station $30_A$ of FIG. 2, while a same or similar but compatible version of the frequency hopping sequence generation system can be installed at a mobile station such as the mobile station $32_A$ of FIG. 2. In addition, FIG. 10 shows an example of an uplink connection using frequency hopping and frequency offset hopping as described above. Typically, a simultaneous downlink connection uses the same frequency hopping sequence.

FIG. 10 also shows how parameters involved in the performance of the frequency hopping technique with variable offset (as described above), including mobile-specific parameters such as FOSEED, are transmitted (e.g., signaled) over the air interface to the mobile station from the network (e.g., from the base station) at strategic times such as in an initial call setup procedure and a handover procedure. FIG. 10 particularly shows an example message in which the parameters can be transmitted to the mobile station in, e.g., a call setup message. Specific parameters included in the call setup message to facilitate performance of the variable frequency offset include the FN, HSN, FOHSN, FOSEED parameters, as well as the FO set and the frequency allocation (the set of allocated frequencies for the mobile station).

The parameters enabling frequency offset hopping are typically transmitted over signaling channels defined for call setup or hand-over signaling. It should be appreciated that the particular message in which the parameters are transmitted is not critical. For example, if in a given system the call setup message does not accommodate such transmission, new messages may be defined or other messages utilized.

Use of frequency offset hopping (e.g., the variable frequency offset) described above naturally entails a network node such as a base station keeping track of which FOSEED values allocated to a cell have been assigned or unassigned, so that an available FOSEED value can be assigned upon call setup with a new mobile station. What particular FOSEED value is assigned to a mobile station from a pool of available values may be arbitrary (e.g., random or least frequently used), or may be influenced by some channel selection strategy.

The set of frequency offsets which are utilized by a cell can be allocated, when a cell is setup or established. The allocation is generally performed by a network operator using an operation and maintenance system or the like, or some other such procedure utilized to set up cells and associated network nodes.

The set of frequency offsets allocated to a cell can also be updated or changed subsequently (due to changes in network or frequency planning, for example). Such can also be the case for other cell-associated parameters, such as HSN and FOHSN, etc.

Even if a set of frequency offsets in a cell is fixed (e.g., the frequency offsets consist of 0, 1, ..., N−1), the frequency offset sets specified for new calls may be subsets of the full set and thus may differ between different calls.

In order to limit signaling in the transmission of parameters between network node and mobile station, it is possible to specify that FOHSN=HSN and that the FO set always comprise {0, 1, ..., N−1}. In so doing, existing GSM messaging could be more easily utilized for apprising the mobile station of the parameters necessary for frequency offset hopping.

Strategies

Four different cases or strategies of system simulations with FO hopping show that capacity gain of FO hopping compared to ordinary frequency hopping is significant for the cases covered in those simulations. In addition, they show that performance is similar to, or better than, purely random FO hopping.

The four different example strategies (also know as "cases") are now described below and later referenced in conjunction with a discussion of simulations. For strategies 2-4, a fractional hardware load of 33% is assumed and it is assumed that the FN counters in base stations with equal HSNs are synchronized. Some of the parameter settings in the strategies may be less than optimal.

Strategy 1 is reflected in Table 3. Strategy S1 implements the situations B1 and B2 discussed above, i.e., $HSN_1$ is not equal to $HSN_2$ (situation B1) or $HSN_1=HSN_2$ and $FOHSN_1$ is not equal to $FOHSN_2$ (situation B2). In strategy 1, there is random allocation of HSNs and FOHSNs. Compared to a situation of no FO hopping with random HSN allocation, strategy 1 has improved adjacent channel interference diversity (ACID) in each cell.

TABLE 3

| | Strategy 1 | | | | | |
|---|---|---|---|---|---|---|
| Site | 1 | 1 | 1 | 2 | 2 | 2 |
| Cell | 1 | 2 | 3 | 4 | 5 | 6 |
| HSN | 3 | 9 | 14 | 17 | 1 | 8 |
| FOHSN | 1 | 2 | 3 | 4 | 5 | 6 |
| FOset | 0-14 | 0-14 | 0-14 | 0-14 | 0-14 | 0-14 |
| FOSEED | 0-14 | 0-14 | 0-14 | 0-14 | 0-14 | 0-14 |

Strategy S2 is reflected by Table 4. Strategy implements the situations A1 and B2 within sites, and situations B1 and B2 between sites. In other words, within sites either $HSN_1=HSN_2$ and there is no overlap of $FOset_1$ and $FOset_2$ (situation A1), or $HSN_1=HSN_2$ and $FOHSN_1$ is not equal to $FOHSN_2$ (situation B2), while between sites $HSN_1$ is not equal to $HSN_2$ (situation B1) or $HSN_1=HSN_2$ and $FOHSN_1$ is not equal to $FOHSN_2$ (situation B2). Compared to a situation of no FO hopping (but with the same HSN allocation and FO allocation), strategy 2 has improved adjacent channel interference diversity (ACID). However, there is no orthogonality between mobile stations in different sites. The FOsets would have to be rearranged to avoid intra-cell adjacent channel interference.

TABLE 4

| | Strategy 2 | | | | | |
|---|---|---|---|---|---|---|
| Site | 1 | 1 | 1 | 2 | 2 | 2 |
| Cell | 1 | 2 | 3 | 4 | 5 | 6 |
| HSN | 3 | 3 | 3 | 9 | 9 | 9 |
| FOHSN | 4 | 9 | 14 | 17 | 1 | 8 |
| FOset | 0-4 | 5-9 | 10-14 | 0-4 | 5-9 | 10-14 |
| FOSEED | 0-4 | 0-4 | 0-4 | 0-4 | 0-4 | 0-4 |

Strategy 3 is reflected by Table 5. Strategy S3 implements the situation A1 within sites and between certain cells in different sites, and situation B2 between all cells. In other words, within sites and between the certain cells in different sites $HSN_1=HSN_2$ and there is no overlap of $FOset_1$ and $FOset_2$ (situation A1), while between all cells $HSN_1=HSN_2$ and $FOHSN_1$ is not equal to $FOHSN_2$ (situation B2). Compared to a situation of no FO hopping but with different HSNs in sites, situation 3 provides orthogonality between more cell pairs (67% instead of 33%). However, interference diversity between non-orthogonal cells is reduced compared to no FO hopping ($p=1/5$ instead of $p_f=1/15$).

TABLE 5

| | Strategy 3 | | | | | |
|---|---|---|---|---|---|---|
| Site | 1 | 1 | 1 | 2 | 2 | 2 |
| Cell | 1 | 2 | 3 | 4 | 5 | 6 |
| HSN | 1 | 1 | 1 | 1 | 1 | 1 |
| FOHSN | 4 | 9 | 14 | 17 | 11 | 8 |
| FOset | 0-4 | 5-9 | 0-14 | 0-4 | 5-9 | 10-14 |
| FOSEED | 0-4 | 0-4 | 0-4 | 0-4 | 0-4 | 0-4 |

Strategy 4 is reflected by Table 6. Strategy S4 implements the situation A2 within sites, and situation B1 or situation B2 between sites. In other words, within sites $HSN_1=HSN_2$, $FOset_1=FOset_2$, and $FOSEED_1$ is not equal to $FOSEED_2$ (situation A2) while between sites $HSN_1$ is not equal to $HSN_2$ (situation B 1) or $HSN_1=HSN_2$ and $FOHSN_1$ is not equal to $FOHSN_2$ (situation B2). Strategy 4 provides orthogonality within a site and full interference diversity (co-channel and adjacent) within and between sites.

TABLE 6

| | Strategy 4 | | | | | |
|---|---|---|---|---|---|---|
| Site | 1 | 1 | 1 | 2 | 2 | 2 |
| Cell | 1 | 2 | 3 | 4 | 5 | 6 |
| HSN | 3 | 3 | 3 | 9 | 9 | 9 |
| FOHSN | 4 | 4 | 4 | 17 | 17 | 17 |
| FOset | 0-14 | 0-14 | 0-14 | 0-14 | 0-14 | 0-14 |
| FOSEED | 0-4 | 5-9 | 9-14 | 0-4 | 5-9 | 10-14 |

Simulations

The simulation results shown below are primarily for comparisons of the suggested FO hopping scheme (long sequences) with "ideal" purely random MAIO hopping utilizing random permutation functions in Matlab. Frame number counters used in different cells are synchronized and unshifted.

Table 7 shows some important system and traffic parameters or settings involved in and resulting from the simulations.

TABLE 7

| Simulations Settings | |
|---|---|
| No. of cells | 48 |
| No. of frequencies | 15 |
| Reuse | 1 |
| No of TRXs/cell | 5 |
| No of TSs/TRX | 2 |
| Offered traffic/cell | 5 E |
| Coherence bandwidth | 4.8 MHz |
| DTX | On |
| Power control | On |
| Cell radius | 500 m |
| Adjacent channel attenuation | 1% |
| Lognormal fading, standard deviation | 8 dB |
| Lognormal fading, correlation, 1 MS to BSs | 0 |
| Lognormal fading correlation distance | 110 m |
| Average mobile speed | 3 m/s |
| Call holding time, mean | 40 s |

Table 8 shows hopping parameter allocations for the four simulated strategies or cases discussed above. In Table 8, "random" means a random allocation of different values. "Site synch" means equal values within sites but a random allocation between sites. FO set and FOSEED allocations are either the same set for all cells or 3 different sets per 3-sector site: {0, 3, 6, 9, 12}, {1, 4, 7, 10, 13}, {2, 5, 8, 11, 14}.

TABLE 8

| | Simulation Strategies | | | |
|---|---|---|---|---|
| | Strategy 1 | Strategy 2 | Strategy 3 | Strategy 4 |
| No. of mobiles served | 3798 | 3776 | 3776 | 3776 |
| HSN Allocation | Random | Site synch | HSN = 1 (all cells) | Site synch |
| FOHSN allocation | Random | Random | Random | Site synch |
| FO allocation | 0-14 | 3 sets/site: =3 | 3 sets/site: =3 | 0-14 |
| FOSEEDs per cell | 0-14 | 0-4 | 0-4 | 3 sets/site: =3 |

Figure 11B:
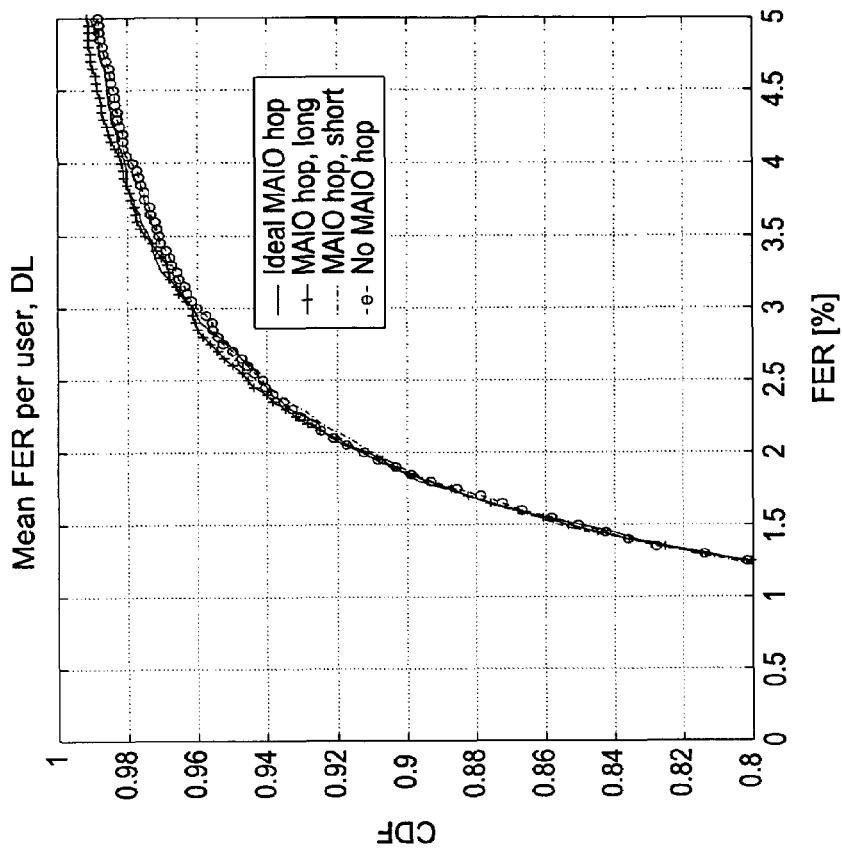
FIG. 11A and FIG. 11B are graphs showing the distributions of mean FER per user for the uplink and the downlink, respectively, for a first strategy.
Figure 11A:
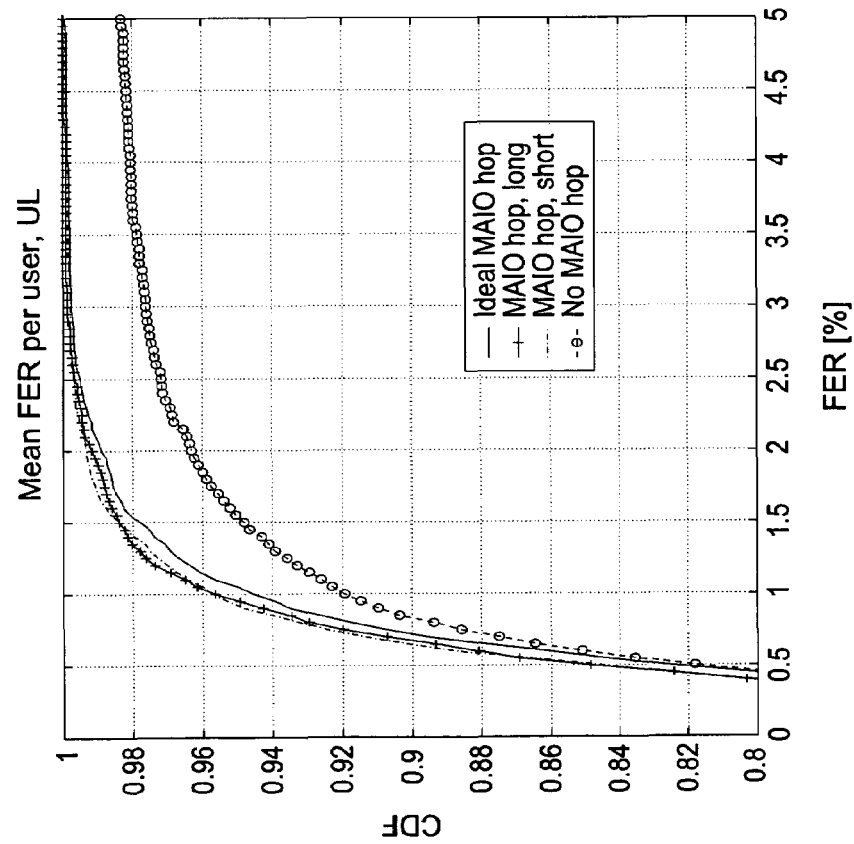

Results are given in Table 9 as the fraction of mobiles experiencing more than 2% frame erasure rate (FER) on either the uplink or the downlink ("unhappy" users). Separate uplink and downlink results are shown as well. FIG. 11A and FIG. 11B show the distributions of mean FER per user for the uplink (FIG. 11A) and the downlink (FIG. 11B) for strategy 1. The difference between ideal and suggested FO hopping is small.

In Table 9, the fraction of unhappy users (mean FER>2% on UL or DL); fraction of users with more than 2% FER on UL; fraction of users with more than 2% FER on DL; and fraction of 0.48-second periods with >2% mean FER.

The results in Table 9 show similar performance for the suggested FO hopping scheme (long sequences) as for ideal FO hopping. The performance for short sequences is similar, but as explained below, increased robustness against certain "dangerous" FN shifts and other parameter settings is obtained with long intra-cell sequences.

TABLE 9

| | Simulation Results | | | |
|---|---|---|---|---|
| | No. FO hop | Short seq. | Long seq. | Ideal |
| Strategy 1 | | | | |
| Fraction unhappy | 11.6% | 9.3% | 9.3% | 9.2% |
| UL: | 3.7% | 0.7% | 0.8% | 1.1% |

TABLE 9-continued

| | Simulation Results | | | |
|---|---|---|---|---|
| | No. FO hop | Short seq. | Long seq. | Ideal |
| DL: | 8.8% | 9.0% | 8.9% | 8.7% |
| Speech with >2% FER | 12.7% | 12.3% | 12.3% | 12.7% |
| Strategy 2 | | | | |
| Fraction unhappy | 7.1% | 5.9% | 6.1% | 6.2% |
| UL: | 1.1% | 0.2% | 0.2% | 0.3% |
| DL: | 6.2% | 5.9% | 6.0% | 6.2% |
| Speech with >2% FER | 10.1% | 10.0% | 10.0% | 10.1% |
| Strategy 3 | | | | |
| Fraction unhappy | 36.4% | 7.7% | 7.7% | 7.7% |
| UL: | 15.7% | 0.4% | 0.3% | 0.3% |
| DL: | 30.7% | 7.5% | 7.5% | 7.5% |
| Speech with >2% FER | 15.1% | 9.5% | 9.5% | 9.3% |
| Strategy 4 | | | | |
| Fraction unhappy | 20.0% | 6.3% | 6.1% | 6.3% |
| UL: | 9.3% | 0.2% | 0.1% | 0.4% |
| DL: | 12.7% | 6.3% | 6.1% | 6.1% |
| Speech with >2% FER | 12.9% | 10.2% | 10.2% | 10.5% |

Collision Properties

Several properties such as collision rates with respect to co-channel and adjacent channel collisions, dispersion of collisions in time and FO differences have been investigated for various cases. A few illustrative comparison examples are discussed below.

The first comparison, shown in Table 10, illustrates collision rates for "dangerous" hopping parameters (FN and HSN). FO hopping with long sequences is not affected much by the choice of hopping parameters, whereas FO hopping with short sequences shows some dispersion of the adjacent channel collision rates. Compared to no FO hopping, the reduction of the dispersion is still significant.

TABLE 10

| | Collision Rates | | | |
|---|---|---|---|---|
| | ideal | long | short | no MAIO hop |
| co-channel, c1-c2 | 0.104/0.118 | 0.100/0.116 | 0.103/0.123 | 0.058/0.286 |
| adj-channel, c1 | 0.212/0.234 | 0.195/0.255 | 0.195/0.299 | 0/0.891 |
| adj-channel, c2 | 0.214/0.231 | 0.195/0.255 | 0.196/0.298 | 0/0.891 |

Table 10 shows the minimum/maximum collision rates between or within the cells c1 and c2. Pertinent parameters for Table 10 are as follows: N=9, cell 1: FN=1-10000, FOs=0-8, HSN=2, FOHSN=1; cell2: FN=2-10001, FOs=0-8, HSN=3, FOHSN=1.

Figure 12:
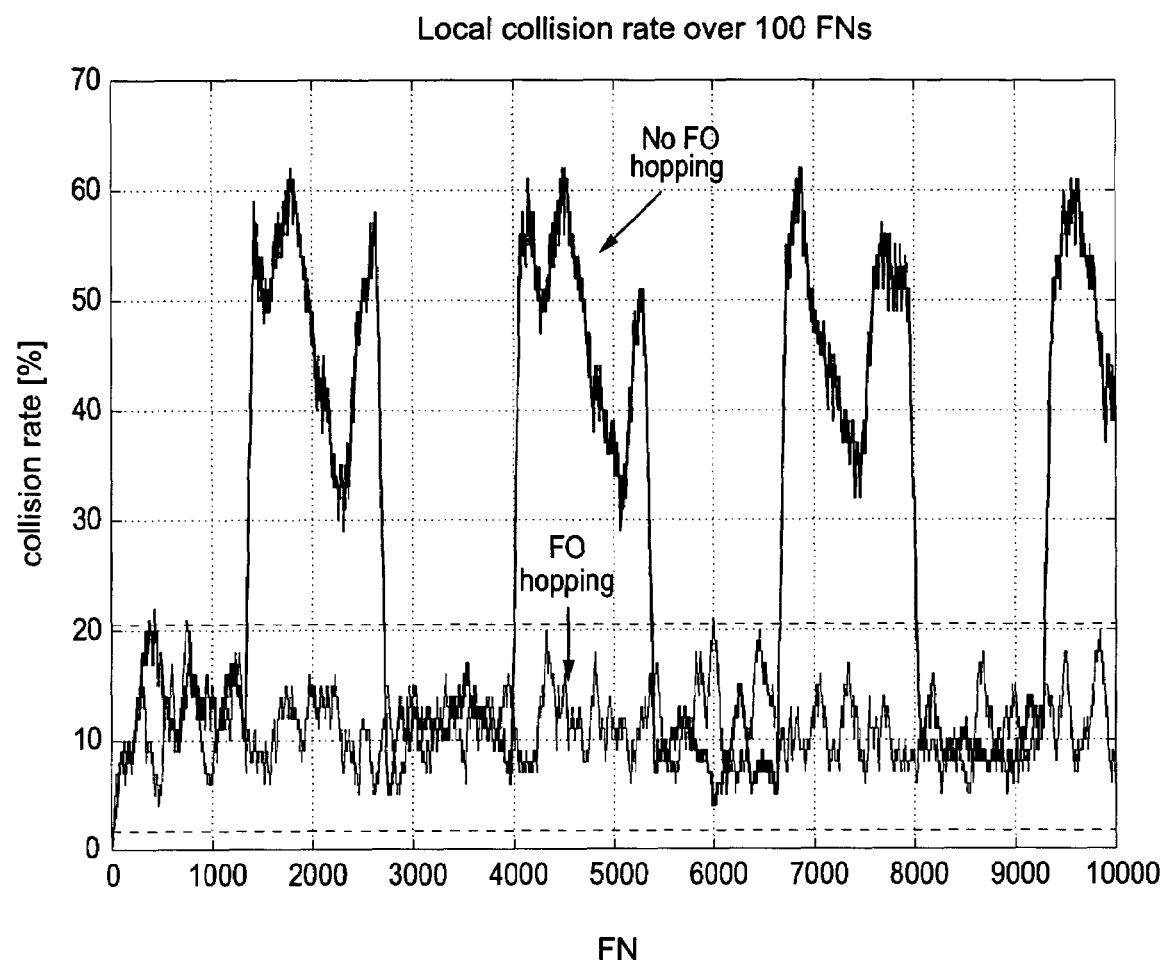
FIG. 12 is a graph illustrating a local collision rate for two frequency hopping sequences.

The long-term average collision rates are equalized by FO hopping. Moreover, FIG. 12 shows how FO hopping with long intra-cell sequences improves the dynamic collision properties between two sequences with the same combination of HSNs and FN shift (equal to 1). The term 'dynamic' collision rate means here the fraction of collisions for a gliding window that covers 100 time steps (FNs). Without FO hopping, large collision rates appear periodically due to the behavior of the GSM hopping algorithm for certain combinations of FN shifts and HSNs. Short sequences give a similar improvement.

FIG. 12 thus illustrates that the mean fraction of collisions between two frequency hopping sequences (N=9) over 100 FNs (gliding window) should reside between the two dashed lines given by $1/9 \pm 3\sigma$ where $\sigma$ is the standard deviation of the fraction of collisions over 100 FNs for perfectly random and independent sequences.

Table 11 shows the collision rates when dangerous hopping parameters are chosen both for the frequency hopping generator (HSN and FN difference) and for FO hopping (FO and FN difference). It can be concluded that the method using short cyclic sequences is significantly affected whereas the method with long sequences is only slightly affected.

TABLE 11

| | ideal | long | short | no MAIO hop |
|---|---|---|---|---|
| co-channel, c1-c2 | 0.103/0.121 | 0.090/0.144 | 0.058/0.168 | 0.058/0.286 |
| adj-channel, c1 | 0.217/0.229 | 0.196/0.256 | 0.197/0.300 | 0/0.891 |

Thus, Table 11 illustrates the min/max collision rates between or within the cells c1 and c2. In Table 11, pertinent parameters are N=9, cell 1: FN=1-10000, FOs=0-8, HSN=2, FOHSN=2; cell2: FN=2-10001, FOs=0-8, HSN=3, FOHSN=3.

The auto-covariance function (ACF) of a general frequency hopping sequence shows that pseudo-random GSM frequency hopping has significant temporal dependencies (N=9, NFO=9, HSN=3). The different FO hopping methods produce a more random frequency hopping sequence than the original GSM algorithm.

Figure 13A:
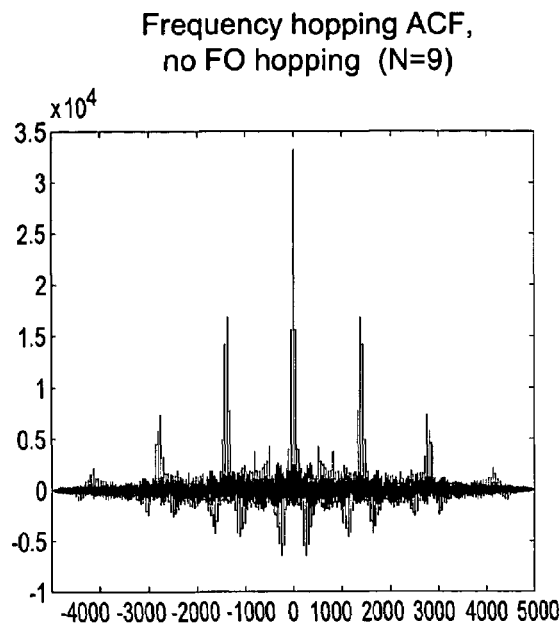
FIG. 13A-FIG. 13D are graphs showing auto-covariance functions of frequency hopping sequences.
Figure 13B:
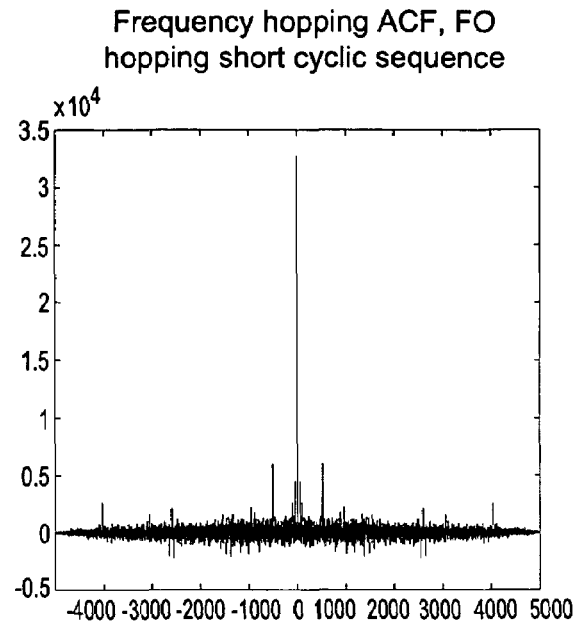
Figure 13C:
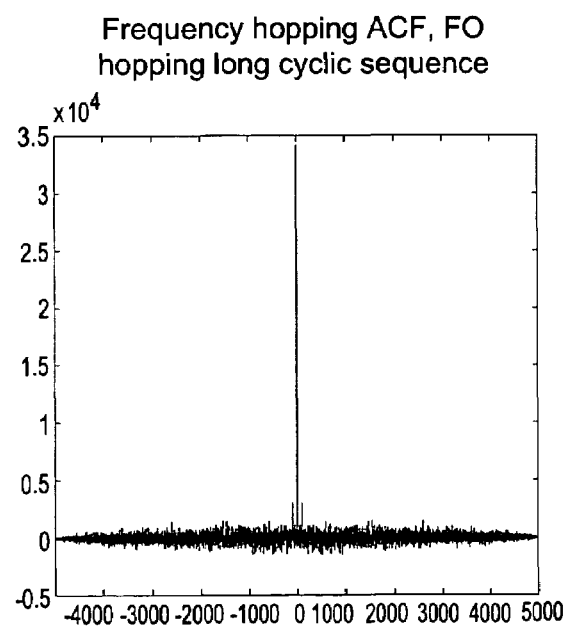
Figure 13D:
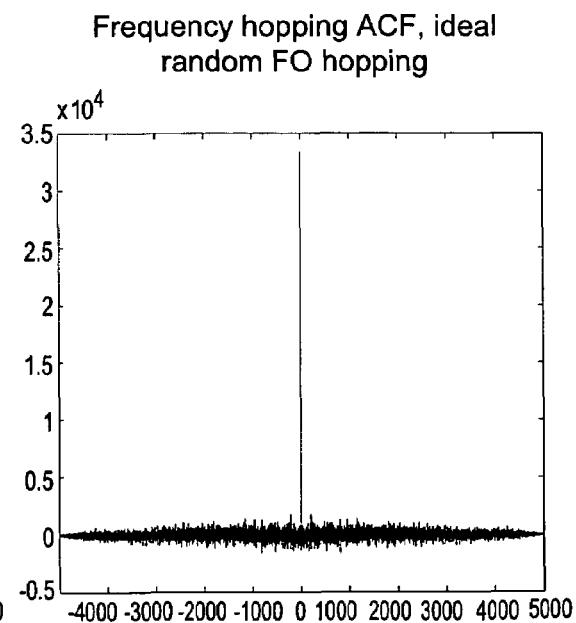

FIG. 13A-FIG. 13D show auto-covariance functions of frequency hopping sequences. FIG. 13A shows no FO hopping; FIG. 13B shows FO hoping, short sequences; FIG. 13C shows FO hopping, long sequences; FIG. 13D shows ideal random FO hopping.

The use of variable frequency offsets in a manner such as that described above has numerous advantages, such as the following (for example): (1) improved adjacent channel interference diversity (e.g., within a cell); (2) improved co-channel interference diversity; (3) improved possibilities to allocate orthogonal hopping sequences between strong interferers while maintaining interference diversity between others; (4) flexibility with respect to choice of generator of inter-cell sequences; and (5) improved randomness (e.g., cross-correlation) if applied to GSM.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for use in a radio telecommunications system comprising:
   a frequency offset hopping sequence generator configured to generate variable frequency offsets for a mobile station during a clocking of a time index, the variable frequency offsets being generated as a function of the time index whereby magnitude of the variable frequency offsets for the mobile station varies based on the time index;
   a frequency hopping generator configured to determine a frequency hopping sequence for use in communication between the mobile station and a network node;
   wherein the variable frequency offsets are chosen so that the frequency hopping sequence provides intra-cell interference diversity;

wherein the frequency hopping sequence generator determines a frequency offset index which is mapped to one of a plural possible frequency offsets, the frequency offset index being determined to provide the frequency hopping sequence with both interference diversity and orthogonality;

wherein the frequency offset index has a first component and a second component; and wherein the first component is an intra-cell component and the second component is an intra-cell component.

2. The apparatus of claim 1, wherein the frequency hopping sequence generator generates the variable frequency offsets on the fly as a function of the time index.

3. The apparatus of claim 1, wherein the inter-cell component is a pseudo-randomly generated number.

4. The apparatus of claim 1, wherein the intra-cell component $I_2$ is determined by $$I_2(FN, FOSEED)=S(1+(FN+FOSEED) \bmod NFO)$$

wherein S is a basic sequence of 0, 2, 4, . . . $K_1$, $K_2$, $K_2-2$ . . . 3, 1, in which $$K_1 = 2 \bullet \left[\frac{NFO-1}{2}\right]$$

$$K_2 = 2 \bullet \left[\frac{NFO}{2}\right] - 1$$

FN is a time index;

NFO is a number of frequency offsets in a set of possible frequency offsets; and FOSEED is a unique integer assigned to the mobile station at one of call setup and handover.

5. The apparatus of claim 4, wherein the frequency hopping sequence generator allocates frequency hopping sequences to render adjacent frequency collision rates between two frequency hopping sequences with equal FOHSN independent of a choice of two different FOSEEDs utilized.

6. The apparatus of claim 1, wherein the frequency hopping sequence generator allocates an intra-cell component sequence to a connection between the mobile station and the network node for repeated cyclical use.

7. The apparatus of claim 1, wherein the frequency hopping sequence generator cyclically switches between plural orthogonal intra-cell component sequences for a connection between the mobile station and the network node.

8. The apparatus of claim 7, wherein the intra-cell component $I_2$ is determined by $$I_2(FN, FOSEED)=S(1+(FN+K) \bmod NFO), \text{ in which}$$

wherein S is a basic sequence of 0, 2, 4, . . . $K_1$, $K_2$, $K_2-2, \ldots 3, 1$, in which $$K_1 = 2 \bullet \left[\frac{NFO-1}{2}\right]$$

$$K_2 = 2 \bullet \left[\frac{NFO}{2}\right] - 1$$

K=S(1+(FOSEED+FN div NFO)mod NFO);

FN is a time index;

NFO is a number of frequency offsets in a set of possible frequency offsets; and FOSEED is a unique integer assigned to the mobile station at one of call setup and handover.

9. The apparatus of claim 1, wherein the frequency hopping sequence generator is situated at the network node.

10. The apparatus of claim 1 wherein the frequency hopping sequence generator is situated at the mobile station.

11. Apparatus for use in a radio telecommunications system comprising:

a frequency offset hopping sequence generator configured to generate variable frequency offsets for mobile station as (1) a function of a clocked time index; and as (2) a function of a unique integer assigned to the mobile station whereby magnitude of the variable frequency offsets for the mobile station varies based on the time index;

a frequency hopping generator configured to determine a frequency hopping sequence for use in communication between the mobile station and network node;

wherein the variable offset is dependent upon an intra-cell component, and wherein the intra-cell component $I_2$ is determined by $$I_2(FN, FOSEED)=S(1+(FN+FOSEED) \bmod NFO),$$

wherein S is a basic sequence of 0, 2, 4, . . . $K_1$, $K_2$, $K_2-2, \ldots 3, 1$, in which $$K_1 = 2 \bullet \left[\frac{NFO-1}{2}\right]$$

$$K_2 = 2 \bullet \left[\frac{NFO}{2}\right] - 1$$

FN is a time index;

NFO is a number of frequency offsets in a set of possible frequency offsets; and FOSEED is a unique integer assigned to the mobile station at one of call setup and handover.

12. Apparatus for use in a radio telecommunications system comprising:

a frequency offset hopping sequence generator configured to generate variable frequency offsets for a mobile station as (1) a function of clocked time index; and as (2) a function of a unique integer assigned to time mobile station whereby magnitude of the variable frequency offsets for the mobile station varies based on the time index;

a frequency hopping generator configured to determine a frequency hopping sequence for use in communication between the mobile station and a network node;

wherein the variable offset is dependent upon an intra-cell component, and wherein the intra-cell component $I_2$ is determined by $$I_2(FN, FOSEED)=S(1+(FN+K) \bmod NFO), \text{ in which}$$

wherein S is a basic sequence of 0, 2, 4, . . . $K_1$, $K_2$, $K_2-2, \ldots 3, 1$, in which $$K_1 = 2 \bullet \left[\frac{NFO-1}{2}\right]$$

$$K_2 = 2 \bullet \left[\frac{NFO}{2}\right] - 1$$

K=S(1+(FOSEED+FN div NFO)mod NFO);

FN is a time index;

NFO is a number of frequency offsets in a set of possible frequency offsets; and FOSEED is a unique integer assigned to the mobile station at one of call setup and handover.

13. A method of operating a receiver which includes a frequency hopping sequence generator for use in a radio telecommunications system, the method including
  generating variable frequency offsets during a clocking of a time index and as a function of the time index whereby magnitude of the variable frequency offsets for a mobile station varies based on the time index;
  utilizing the variable frequency offsets to determine a frequency hopping sequence for use in communication between the mobile station and a network node;
  determining a frequency offset index and mapping the frequency offset index to one of plural possible frequency offsets, the frequency offset index being determined to provide the frequency hopping sequence with both interference diversity and orthogonality;
  determining the frequency offset index from a first component and a second component; and
  wherein the first component is an intra-cell component and the second component is an intra-cell component.

14. The method of claim 13, further comprising generating the inter-cell component as a pseudo-randomly generated number.

15. The method of claim 13, wherein the variable frequency offsets are chosen so that the frequency hopping sequence provides intra-cell interference diversity.

16. The method of claim 13, further comprising generating the variable frequency offsets on the fly as a function of the time index.

17. The method of claim 13, further comprising choosing the variable frequency offsets so that the frequency hopping sequence provides intra-cell interference diversity.

18. The method of claim 13, further comprising determining the intra-cell component $I_2$ as:

$$I_2(FN, FOSEED) = S(1 + (FN + FOSEED) \bmod NFO)$$

$$K_1 = 2 \bullet \left[\frac{NFO-1}{2}\right]$$

$$K_2 = 2 \bullet \left[\frac{NFO}{2}\right] - 1$$

wherein S is a basic sequence of 0, 2, 4, . . . $K_1$, $K_2$, $K_2-2$, . . . 3, 1, in which FN is a time index;
NFO is a number of frequency offsets in a set of possible frequency offsets; and
FOSEED is a unique integer assigned to the mobile station at one of call setup and handover.

19. The method of claim 18, further comprising allocating the frequency hopping sequences to render adjacent frequency collision rates between two frequency hopping sequences with equal FOHSN independent of a choice of two different FOSEEDs utilized.

20. The method of claim 13, further comprising allocating an intra-cell component sequence to a connection between the mobile station and the network node for repeated cyclical use.

21. The method of claim 13, further comprising cyclically switching between plural orthogonal intra-cell component sequences for a connection between the mobile station and the network node.

22. The method of claim 21, further comprising determining the intra-cell component $I_2$ as:

$$I_2(FN, FOSEED) = S(1+(FN+K) \bmod NFO), \text{ in which}$$

wherein S is a basic sequence of 0, 2, 4, . . . $K_1$, $K_2$, $K_2-2$, . . . 3, 1, in which $$K_1 = 2 \bullet \left[\frac{NFO-1}{2}\right]$$

$$K_2 = 2 \bullet \left[\frac{NFO}{2}\right] - 1$$

$$K=S(1+(FOSEED+FN \text{ div } NFO) \bmod NFO);$$

FN is a time index;
NFO is a number of frequency offsets in a set of possible frequency offsets; and
FOSEED is a unique integer assigned to the mobile station at one of call setup and handover.

23. A method of operating a receiver which includes a frequency hopping sequence generator for use in a radio telecommunications system, the method including
  generating variable frequency offsets as a function of clocking time index and as a function of a unique integer assigned to the mobile station whereby magnitude of the variable frequency offsets for a mobile station varies based on the time index; and
  utilizing the variable frequency offsets to determine a frequency hopping sequence for use in communication between the mobile station and a network node;
  wherein the variable offset is dependent upon an intra-cell component, and wherein the intra-cell component $I_2$ is determined by $$I_2(FN, FOSEED)=S(1+(FN+FOSEED) \bmod NFO)$$

wherein S is a basic sequence of 0, 2, 4, . . . $K_1$, $K_2$, $K_2-2$, . . . 3, 1, in which $$K_1 = 2 \bullet \left[\frac{NFO-1}{2}\right]$$

$$K_2 = 2 \bullet \left[\frac{NFO}{2}\right] - 1$$

FN is a time index;
NFO is a number of frequency offsets in a set of possible frequency offsets; and
FOSEED is a unique integer assigned to the mobile station at one of call setup and handover.

24. The method of claim 23, further comprising generating the variable frequency offsets on the fly as a function of the time index.

25. A method of operating a receiver which includes a frequency hopping sequence generator for use in a radio telecommunications system, the method including
  generating variable frequency offsets as a function of a clocking time index and as a function of a unique integer assigned to the mobile station whereby magnitude of the variable frequency offsets for a mobile station varies based on the time index; and
  utilizing the variable frequency offsets to determine a frequency hopping sequence for use in communication between the mobile station and a network node;
  wherein the variable offset is dependent upon an intra-cell component, and wherein the intra-cell component $I_2$ is determined by $$I_2(FN, FOSEED)=S(1+(FN+K) \bmod NFO), \text{ in which}$$

wherein S is a basic sequence of 0, 2, 4, ... $K_1$, $K_2$, $K_2-2$, ... 3, 1, in which $$K_1 = 2 \bullet \left[\frac{NFO-1}{2}\right]$$

$$K_2 = 2 \bullet \left[\frac{NFO}{2}\right] - 1$$

$K=S(1+(FOSEED+FN \text{ div } NFO) \text{mod } NFO)$;

FN is a time index;

NFO is a number of frequency offsets in a set of possible frequency offsets; and FOSEED is a unique integer assigned to the mobile station at one of call setup and handover.

26. The method of claim 25, further comprising generating the variable frequency offsets on the fly as a function of the time index.

27. A method of operating a radio telecommunications system, the method comprising:
allocating a set of frequency offsets to a cell;
generating, during a clocking of a time index and as a function of the time index, a frequency offset index for mobile station communicating with a network node of the radio telecommunications system;
using the frequency offset index to determine from the set of frequency offsets a selected frequency offset to use for a time step corresponding to the time index in determining a frequency hopping sequence for communication between the mobile station and the network node whereby magnitude of the frequency offsets for the mobile station varies based on the time index;
wherein the step of generating the frequency offset index comprises generating an inter-cell component and an intra-cell component.

28. The method of claim 27, further comprising generating the variable frequency offsets on the fly as a function of the time index.

29. The method of claim 27, further comprising mapping the frequency offset index to the selected frequency offset.

30. The method of claim 27, further comprising generating the intra-cell component to provide orthogonal sequences with a variable difference between two sequences.

31. The method of claim 27, further comprising generating the inter-cell component to provide collision diversity between frequency hopping sequences that are not orthogonal.

32. A method of operating a radio telecommunications system, the method comprising:
allocating a set of frequency offset to a cell;
generating, during a clocking of a time index and as a function of the time index, a frequency offset index for a mobile station communicating with a network node of the radio telecommunications system;
using the frequency offset index to determine front the set of frequency offsets a selected frequency offset to use for a time step corresponding to the time index in determining a frequency hopping sequence for communication between the mobile station and the network node whereby magnitude of the frequency offsets for the mobile station varies based on the time index;
wherein the step of generating the frequency offset index I for each time step comprises:
generating an inter-cell component $I_1$ and an intra-cell component $I_2$;
determining the frequency offset index I as $I=I_1+I_2$ modulo a number of frequency offsets utilized.

33. The method of claim 32, further comprising generating the variable frequency offsets on the fly as a function of the time index.

34. A method of operating a radio telecommunications system, the method comprising:
allocating a set of frequency offsets to a cell;
generating, during a clocking of a time index and as a function of the time index, a frequency offset index for a mobile station communicating with a network node of the radio telecommunications system;
using the frequency offset index to determine front the set of frequency offsets a selected frequency offset to use for a time step corresponding to the time index in determining a frequency hopping sequence for communication between the mobile station and the network node whereby magnitude of the frequency offsets for the mobile station varies based on the time index;
wherein the step of generating the frequency offset index I for each time step comprises:
generating an inter-cell component $I_1$ and an intra-cell component $_2$;
pseudo-randomly generating the inter-cell component $I_1$.

35. The method of claim 34, further comprising generating the variable frequency offsets on the fly as a function of the time index.

36. A method of operating a radio telecommunications system, the method comprising:
allocating a set of frequency offsets to a cell:
generating, during a clocking of a time index and as a function of the time index, a frequency offset index for a mobile station communicating with a network node of the radio telecommunications system;
using the frequency offset index to determine from the set of frequency offsets a selected frequency offset to use for a time step corresponding to the time index in determining a frequency hopping sequence for communication between the mobile station and the network node whereby magnitude of the frequency offsets for the mobile station varies based on the time index;
wherein the step of generating the frequency offset index I for each time step comprises:
generating an inter-cell component $I_1$ and an intra-cell component $I_2$;
obtaining the intra-cell component $I_2$ as:

$I_2(FN, FOSEED)=S(1+(FN+FOSEED) \text{mod } NFO)$ wherein S is a basic sequence of 0, 2, 4, ... $K_1$, $K_2$, $K_2-2$, ... 3, 1, in which $$K_1 = 2 \bullet \left[\frac{NFO-1}{2}\right]$$

$$K_2 = 2 \bullet \left[\frac{NFO}{2}\right] - 1$$

FN is a time index;

NFO is a number of frequency offsets in a set of possible frequency offsets; and FOSEED is a unique integer assigned to the mobile station at one of call setup and handover.

37. The method of claim 36, further comprising generating the variable frequency offsets on the fly as a function of the time index.

38. A method of operating a radio telecommunications system, the method comprising:
  allocating a set of frequency offsets to a cell;
  generating, during clocking of a time index and as function of the time index, a frequency offset index for a mobile station communicating with a network node of the radio telecommunication system;
  using the frequency offset index to determine from the set of frequency offsets a selected frequency offset to use for a time step corresponding to the time index in determining a frequency bopping sequence for communication between the mobile station and the network node whereby magnitude of the frequency offsets for the mobile station varies based on the time index;
  wherein the step of generating the frequency offset index I for each time step comprises:
  generating an inter-cell component $I_1$ and an intra-cell component $I_2$;
  obtaining the intra-cell component $I_2$ as:

$I_2(FN, FOSEED) = S(1+(FN+K) \bmod NFO)$, in which wherein S is a basic sequence of 0, 2, 4, ... $K_1$, $K_2$, $K_2-2$, ... 3, 1, in which $$K_1 = 2 \cdot \left[\frac{NFO-1}{2}\right]$$

$$K_2 = 2 \cdot \left[\frac{NFO}{2}\right] - 1$$

$K = S(1+(FOSEED+FN \text{ div } NFO) \bmod NFO)$;

FN is a time index;
  NFO is a number of frequency offsets in a set of possible frequency offsets; and
  FOSEED is a unique integer assigned to the mobile station at one of call setup and handover.

39. The method of claim 38, wherein the variable frequency offsets are chosen so that the frequency hopping sequence provides intra-cell interference diversity.

40. The method of claim 38, further comprising generating the variable frequency offsets on the fly as a function of the time index.

* * * * *

UNITED STATES PATENT AND TRADEMARK OFFICE
CERTIFICATE OF CORRECTION

PATENT NO. : 7,421,005 B2
APPLICATION NO. : 10/681569
DATED : September 2, 2008
INVENTOR(S) : Craig et al.

It is certified that error appears in the above-identified patent and that said Letters Patent is hereby corrected as shown below:

In Column 2, Line 5, delete "Shad 1" and insert -- $S_1$ --, therefor.

In Column 5, Line 25, delete "$K_{2=2}$" and insert -- $K_2$=2 --, therefor.

In Column 5, Line 48, delete "O-M," and insert -- 0-M, --, therefor.

In Column 8, Line 47, delete "dose" and insert -- does --, therefor.

In Column 11, Line 66, delete "$I_2(O)$" and insert -- $I_2(0)$ --, therefor.

In Column 18, Line 54, delete "S2" and insert -- 2 --, therefor.

In Column 18, Line 54, insert -- S2 --, before "implements".

In Column 19, Line 42, delete "B 1)" and insert -- B1) --, therefor.

In Column 22, Line 32, delete "hoping," and insert -- hopping, --, therefor.

In Column 23, Line 9, in Claim 1, delete "intra-cell" and insert -- inter-cell --, therefor.

In Column 24, Line 3, in Claim 10, after "claim 1" insert -- , --.

In Column 25, Line 18, in Claim 13, delete "intra-cell" and insert -- inter-cell --, therefor.

In Column 27, Line 57, in Claim 32, delete "front" and insert -- from --, therefor.

In Column 28, Line 13, in Claim 34, delete "front" and insert -- from --, therefor.

In Column 28, Line 23, in Claim 34, delete "$_2$;" and insert -- $I_2$; --, therefor.

UNITED STATES PATENT AND TRADEMARK OFFICE
CERTIFICATE OF CORRECTION

PATENT NO.         : 7,421,005 B2
APPLICATION NO.    : 10/681569
DATED              : September 2, 2008
INVENTOR(S)        : Craig et al.

It is certified that error appears in the above-identified patent and that said Letters Patent is hereby corrected as shown below:

In Column 28, Line 31, in Claim 36, delete "cell:" and insert -- cell; --, therefor.

In Column 29, Line 4, in Claim 38, after "during" insert -- a --.

In Column 29, Line 4, in Claim 38, after "as" insert -- a --.

In Column 29, Line 7, in Claim 38, delete "telecommunication" and insert -- telecommunications --, therefor.

In Column 29, Line 11, in Claim 38, delete "bopping" and insert -- hopping --, therefor.

Signed and Sealed this

Thirty-first Day of March, 2009

JOHN DOLL
*Acting Director of the United States Patent and Trademark Office*